United States Patent
Koenecke et al.

(10) Patent No.: US 6,368,110 B1
(45) Date of Patent: Apr. 9, 2002

(54) EDUCATIONAL HOMEROOM FOR PROVIDING USER SPECIFIC EDUCATIONAL TOOLS AND INFORMATION

(75) Inventors: Lynne Koenecke, Grayson; Jennifer Hart, Dunwoody; Burr Warne, Atlanta; David Stirling, Stockbridge, all of GA (US); Scott Bain, Bothell, WA (US); Clint Crowe, Lawrenceville, GA (US)

(73) Assignee: Epic Learning, Atlanta, GA (US)

( * ) Notice: Subject to any disclaimer, the term of this patent is extended or adjusted under 35 U.S.C. 154(b) by 0 days.

(21) Appl. No.: 09/564,781

(22) Filed: May 4, 2000

Related U.S. Application Data

(60) Provisional application No. 60/157,443, filed on Oct. 4, 1999.

(51) Int. Cl.[7] ............................................... G09B 19/00
(52) U.S. Cl. ..................................... 434/219; 434/350
(58) Field of Search ............................... 431/350, 307 R, 431/322, 323, 118, 119, 219

(56) References Cited

U.S. PATENT DOCUMENTS

| | | | | | |
|---|---|---|---|---|---|
| 5,310,349 | A | * | 5/1994 | Daniels et al. | 434/350 |
| 5,823,781 | A | * | 10/1998 | Hitchcock et al. | 434/118 |
| 5,907,831 | A | * | 5/1999 | Lotvin et al. | 705/14 |
| 6,157,808 | A | * | 12/2000 | Holingsworth | 434/350 |
| 6,164,974 | A | * | 12/2000 | Carlile et al. | 434/322 |
| 6,190,178 | B1 | * | 2/2001 | Oh | 434/323 |

* cited by examiner

Primary Examiner—Joe H. Cheng
Assistant Examiner—Kathleen M. Christman
(74) Attorney, Agent, or Firm—Thomas, Kayden Horstemeyer & Risley, LLP

(57) ABSTRACT

In general, an educational homeroom provides a central location for a student to receive and interact with educational tools and information that are focused upon a Knowledge Area in which the student has expressed educational interest. When the student expresses educational interest, the educational homeroom dynamically changes such that options made available to the student are always tailored to offer educational tools and information within the student's Knowledge Areas of choice.

1 Claim, 37 Drawing Sheets

Fig. 5

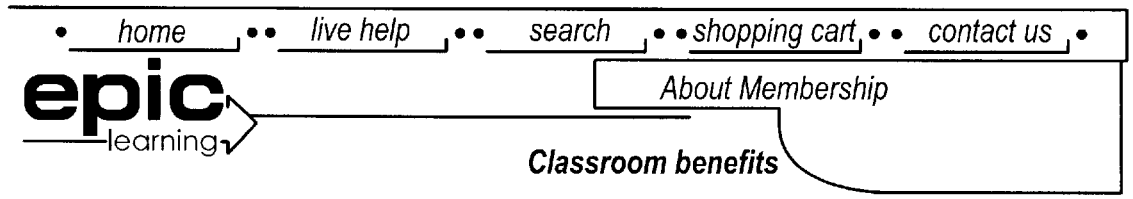

Become an Epic Member for Free!

Please enter the following information as you would like it to appear in our records. This information is not sold or marketed to anyone!

✐ Required Fields

Three great reasons to join our community:

1. Access to an online community of people with whom to share your interests, experiences, and knowledge – via chats, bulletin boards, and more.

2. Career resources – online workshops, featured articles, career advice, links to job search sites – all you need to get (and keep) the job you want!

3. Research and reading recommendations: white papers, internet links, book listings, articles, and more.

First Name ✐ [          ]
Last Name ✐ [          ]
E-Mail ✐ [          ]
Your e-mail is your login username.

Create a login password ✐ [          ]
A valid password should be between 4 and 10 characters (numbers and letter only).
Confirm your password ✐ [          ]
Password Hint ✐ [          ] Optional
Password hint helps you remember your password, such as my child's name, my pet's name, etc.
Home Country ✐ [United States of America ▼]
US Zip Code ✐ [          ]
Zip code is required for US users, leave blank if you are international user.
Would you like to receive updates and information from Epiclearning.com via email?  ● Yes  ○ No
I am interested in learning more. Please have an Epiclearning.com representative contact me.  ● Yes  ○ No
Home Phone [          ] Optional

[ Submit Form ]   [ Reset Form ]

Fig. 6

• home •• live help •• search ••shopping cart•• contact us • epic learning

▷ My Homeroom
▷ Log Out

Welcome to your Homeroom

Need an answer?
...ask your Coach!
Microsoft Technical ▼
GO!

knowledge areas
(new) Microsoft Networking
(new) Novell Networking
(new) Oracle Database Administration
(new) Web Development
(new) Microsoft Office career center
(new) Personal & Professional Workshop Series
(new) Enrolled Classes
Career Advice
Resume Web Sites
Resume Advice
Job Search Sites
Research Companies
Recommended Books
(new) Career Coaching
Enter Your Online Resume salary smarts
Salary Information study rooms
Study rooms are chat room meet with others to discuss after a classroom session discussions.

(new) Upcoming Scheduled
Introduce Yourself
Microsoft Technical
Novell Technical
Oracle Technical
WebPro Technical
Desktop Users
(new) Career Advice discussion forums
Discussion forums enable information with others by reading articles already pos.

Enter Discussion Forum member services
Financing
Update Personal Info
Change Homeroom i-led schedule
Click here for i-led setup instructions.
If you are enrolled, click on the class to attend. If you are not enrolled, click on the class to enroll.
Next 5 Instructor-Led Classes Scheduled for All Your Training Plans:  Status

| | |
|---|---|
| Step 13 MILT: Troubleshooting 983 3/15/00 7:00pm EST | Enroll |
| Step 2 MOIL Installing NT 3/15/00 1:00am EST | Open |
| Step 11 MOIL Troubleshooting 3/15/00 7:00pm EST | Open |
| Step 4 MILT: User Planning & Implementation 3/15/00 10:00pm EST | Open |
| Step 5 MOIL User Planning & Implementation 3/15/00 10:00pm EST | Open |

Fig. 8

• home •• live help •• search •• shopping cart •• contact us • epic learning

Welcome to the Microsoft Knowledge Area

▷ My Homeroom
▷ Log Out knowledge areas
[Microsoft Networking ▼]
GO!

Need an answer?
...ask your Coach!
[Microsoft Technical ▼]
GO!

training plans
MCSE Online Sample Training Plan
MCSE + I Online Sample Training Plan seminars
Planning for Windows NT 4.0 Deployment
NT & Novell Netware Interoperability
WINS Replication
Networking & Remote Access Services (RAS)
*new* Microsoft Online Seminars learning resources
Microsoft Resource
MCSE Test Prep Site
IT Publications
General Information
*new* Dump2Exam
*new* Windows NT Frequen
*new* Topacio Braindumps getting started
Microsoft Online Program i-led schedule
Before Attending, Click Here for Setup Info
If you enrolled, click on the class to attend. If you are not enrolled, click on the class to enroll.

| Next 10 Instructor-Led classes scheduled for your Training Plans: | Status |
|---|---|
| Step 9 MOIL Monitoring & Optimization 1/11/00 10:00pm EST | Shop Now |
| Step 17 MOIL How Networks Work 1/12/00 10:00am EST | Shop Now |
| Step 36 MOIL Installation & Using MMC 1/12/00 10:00pm EST | Shop Now |
| Step 2 MOIL Installing NT 1/13/00 4:00pm EST | Shop Now |
| Step 7 MOIL TCP/IP Setup & Configuration 1/13/00 4:00pm EST | Shop Now |
| Step 30 MOIL TCP/IP Basics 1/13/00 10:00pm EST | Shop Now |
| Step 9 MOIL Monitoring & Optimization 1/16/00 5:00pm EST | Shop Now |
| Step 17 MOIL How Networks Work 1/17/00 10:00am EST | Shop Now |
| Step 8 MOIL NT Printing 1/17/00 1:00pm EST | Shop Now |
| Step 6 MOIL Sharing & Permissions 1/17/00 10:00pm EST | Shop Now |

Fig. 9

• home •• live help •• search •• shopping cart •• contact us • epic learning

Welcome to the Novell Knowledge Area

▷ My Homeroom
▷ Log Out knowledge areas
[Microsoft Networking ▼]
GO!

Need an answer?
...ask your Coach!
[Member Services ▼]
GO!

training plans
Novell CNE Sample Training Plan
Novell CNA Sample Training Plan seminars
Novell Promotions & Events
Local Novell Seminars
Novell Netware 5 Resource List learning resources
Novell Support
Cramsession - Novell CN
Certsites - CNE Study
Craig's Novell NAL
NetWare Users
NetWare 5.1 P&A getting started
Novell Online Program i-led schedule
Before Attending, Click Here for Setup Info

If you are enrolled, click on the class to attend. If you are not enrolled, click on the class to enroll.

| Next 10 Scheduled Instructor-Led Classes for your Training Plans: | Status |
|---|---|
| Step 5 NOIL Zen Works 1/12/00 1:00pm EST | Shop Now |
| Step 6 NOIL Printing 1/14/00 1:00pm EST | Shop Now |
| Step 10 NOIL Upgrading 1/17/00 1:00pm EST | Shop Now |
| Step 11 NOIL DNS/DHCP & Fast Track Server 1/19/00 1:00pm EST | Shop Now |
| Step 12 NOIL Advanced Server Management 1/21/00 1:00pm EST | Shop Now |
| Step 13 NOIL Advanced DNS Management 1/24/00 1:00pm EST | Shop Now |
| Step 14 NOIL Queue Based Printing 1/26/00 1:00pm EST | Shop Now |
| Step 15 NOIL Planning 1/31/00 1:00pm EST | Shop Now |
| Step 18 NOIL Planning 1/31/00 1:00pm EST | Shop Now |

• home •• live help •• search •• shopping cart •• contact us • epic learning

Welcome to the Web Professional Knowledge Area

▷ My Homeroom
▷ Log Out knowledge areas
Microsoft Networking ▼

GO!

Need an answer?
...ask your Coach!
Microsoft Technical ▼

GO!

training plans
WebPro Foundations Sample Training Plan
WebPro WAD Sample Training Plan seminars
Planning for Windows NT 4.0 Deployment
Novell NetWare Interoperability
WINS Replication
Networking and Remote Access Services (RAS)

Web Publications
CIO WebBusiness
ACM Publications
Web Builder Magazine
Web Techniques
Web Developer
Internet.Com
Active Web Developer learning resources
CSSI Test Suite
Internet Engineering
The WWW Virtual L
The Web Developer
Webopedia
whatis.com i-led schedule
Before Attending, Click Here for Setup Info

If you are enrolled, click on the class to attend. If you are not enrolled, click on the class to enroll.

| Currently Scheduled Instructor-Led Classes | Status |
|---|---|
| Step 2 WPIL Applying Your Skills (HTML) 1/15/00 12:00pm EST | Shop Now |
| Step 3 WPIL Network Concepts and Application 1/22/00 12:00pm EST | Shop Now |
| Step 1 WPIL Oveview of Emerging Technologies 1/24/00 2:00pm EST | Shop Now |
| Step 2 WPIL Applying Your Skills (HTML) 1/31/00 2:00pm EST | Shop Now |

Fig. 12

• home •• live help •• search •• shopping cart •• contact us • epic learning

Welcome to the Microsoft Office Knowledge Area

▷ My Homeroom
▷ Log Out knowledge areas
[Microsoft Networking ▼]
GO!

Need an answer?
...ask your Coach!
[Member Services ▼]
GO!

training plans
MS Office Outlook Sample Training Plan
MS Office Excel Sample Training Plan learning resources
Microsoft Resource Links
MCSE Test Prep Sites
IT Publications
General Information Sites
Official Microsoft MOUS Site seminars
How to Become i-led schedule
Before Attending, Click Here for Setup Info

If you are enrolled, click on the class to attend. If you are not enrolled, click on the class to enroll.

| Next 10 scheduled Instructor-Led classes for your Training Plan: | Status |
|---|---|
| Step 2 DOIL Entering & Formatting Data 1/12/00 1:00pm EST | Shop Now |
| Step 1 DOIL Getting Started with Excel 97 1/17/00 1:00pm EST | Shop Now |
| Step 2 DOIL Entering & Formatting Data 1/18/00 1:00pm EST | Shop Now |
| Step 3 DOIL Calculating Data 1/21/00 1:00pm EST | Shop Now |
| Step 1 DOIL Getting Started with Outlook 97 1/27/00 1:00pm EST | Shop Now |
| Step 1 DOIL Getting Started with Outlook 97 1/28/00 1:00pm EST | Shop Now |

Fig. 13

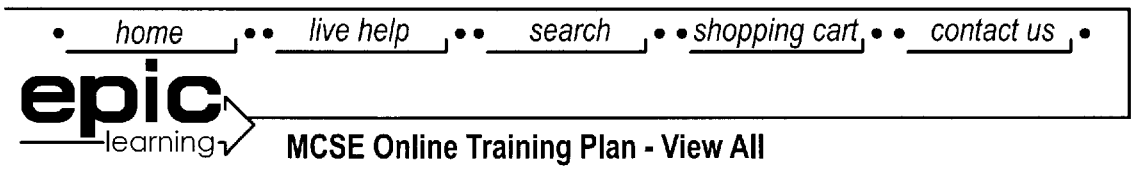

MCSE Online Training Plan - View All

▷ My Homeroom
▷ Log Out

| Step | Task To Do | Task Type | Action |
|---|---|---|---|
| 1 | MOIL New Member Orientation | Online Instructor Led | Shop |
| 1 | Windows NT User Fundamentals | CBT | Shop |
| 1 | Teach Yourself Networking VISUALLY | Reading | Shop |

| Step | Task To Do | Task Type | Action |
|---|---|---|---|
| 2 | MOC 922-1 | Reading | Shop |
| 2 | LAB 922-1 | Lab | Shop |
| 2 | Win NT 4.0 Server Core Technologies Part 1 | CBT | Shop |
| 2 | MOIL Installing NT | Online Instructor Led | Shop |

| Step | Task To Do | Task Type | Action |
|---|---|---|---|
| 3 | MOC 922-2 | Reading | Shop |
| 3 | MOIL Profiles & Policies | Online Instructor Led | Shop |
| 3 | New Riders Workstation-1 | Reading | Shop |
| 3 | New Riders Server-1 | Reading | Shop |

| Step | Task To Do | Task Type | Action |
|---|---|---|---|
| 4 | Win NT 4.0 Server Core Technologies Part 2 | CBT | Shop |
| 4 | MOIL Hard Disk Partitioning | Online Instructor Led | Shop |
| 4 | New Riders Server-2 | Reading | Shop |
| 4 | LAB 922-2 | Lab | Shop |
| 4 | New Riders Workstation-3 | Reading | Shop |

| Step | Task To Do | Task Type | Action |
|---|---|---|---|
| 5 | MOC 803-1 | Reading | Shop |
| 5 | MOC 922-3 | Reading | Shop |
| 5 | MOIL User Planning & Implementation | Online Instructor Led | Shop |
| 5 | Admin Windows NT 4.0 Fund P1 | CBT | Shop |

| Step | Task To Do | Task Type | Action |
|---|---|---|---|
| 6 | MOIL Sharing & Permissions | Online Instructor Led | Shop |
| 6 | New Riders Server-3 | Reading | Shop |
| 6 | LAB 803-1 | Lab | Shop |
| 6 | Archive Sharing & Permissions | Archive class | Shop |

| Step | Task To Do | Task Type | Action |
|---|---|---|---|
| 7 | Win NT 4.0 Server Core Technologies Part 3 | CBT | Shop |
| 7 | MOC 922-4 | Reading | Shop |
| 7 | LAB 922-3 | Lab | Shop |
| 7 | MOIL TCP/IP Setup & Configuration | Online Instructor Led | Shop |

| Step | Task To Do | Task Type | Action |
|---|---|---|---|
| 8 | New Riders Workstation-5 | Reading | Shop |
| 8 | New Riders Server-4 | Reading | Shop |
| 8 | LAB 803-2 | Lab | Shop |
| 8 | MOIL NT Printing | Online Instructor Led | Shop |

| Step | Task To Do | Task Type | Action |
|---|---|---|---|
| 9 | Admin Windows NT 4.0 Fund P2 | CBT | Shop |
| 9 | MOC 803-2 | Reading | Shop |
| 9 | MOIL Monitoring & Optimization | Online Instructor Led | Shop |

| Step | Task To Do | Task Type | Action |
|---|---|---|---|
| 10 | MOIL Interoperating with NT | Online Instructor Led | Shop |
| 10 | New Riders Server-5 | Reading | Shop |
| 10 | LAB 922-4 | Lab | Shop |

| Step | Task To Do | Task Type | Action |
|---|---|---|---|
| 11 | Win NT 4.0 Server Core Technologies Part 4 | CBT | Shop |
| 11 | MOIL Troubleshooting | Online Instructor Led | Shop |
| 11 | New Riders Workstation-5 | Reading | Shop |
| 11 | New Riders Server-5 | Reading | Shop |

Fig. 14

• home •• live help •• search •• shopping cart •• contact us • epic learning

▷ My Homeroom
▷ Log Out

Microsoft Resource Links         ⊙ Back

Microsoft Home Page
Microsoft Knowledge Base
MCP Certification Information
Microsoft Download Site
Microsoft Events Site
Hardware Compatibility List
White Paper on Adpative Testing
Microsoft TechNet

Fig. 17

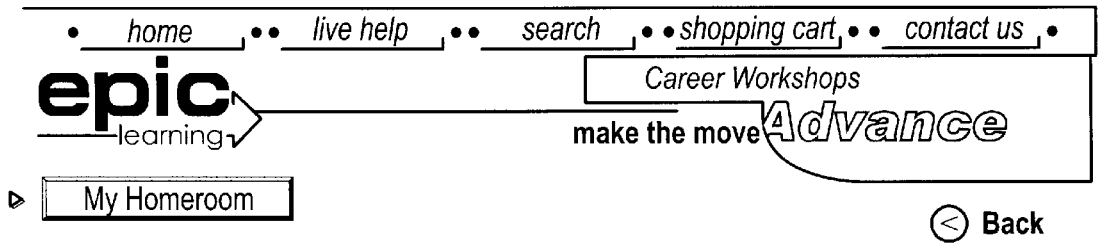

• home •• live help •• search •• shopping cart •• contact us •

Career Workshops
make the move Advance

▷ My Homeroom

◁ Back

Events Calendar
Upcoming Workshops

Career Coach Bios
Heather Williams
Kelly Makara

Personal & Professional Development Workshop Series
Presented by: Epiclearning.com Epiclearning.com has long recognized the value and importance of combining our educational programs with career guidance and support. Our mission is to provide both individuals and corporations with the tools they need to evaluate and develop their career goals.

The workshops listed below are designed to help our members develop the non-technical skills they need to be successful in today's job market. Many of the following offerings are free to epiclearning.com members; some have a nominal charge.

| Buy Now |    Currently Scheduled Workshops:

To view a description of a workshop, click on the workshop name.
To enroll in a free workshop, click the Option Enroll link.
To purchase a workshop, check the Option checkbox(es) and then click [Buy Now].

☐ CDOC Exploring Your Values & Beliefs 3/16/00 8:30pm EST $15.00
☐ CDOC Your Leadership Style 3/17/00 12:00pm EST $15.00
☐ CDOC Your Leadership Style 3/17/00 3:00pm EST $15.00
☐ CDOC Succeeding in the Workplace 3/20/00 8:30pm EST $15.00
☐ CDOC Embracing Diversity in the Workplace 3/24/00 12:00pm EST $15.00
☐ CDOC Stress Management 3/27/00 3:00pm EST $15.00
☐ CDOC Interviewing for and Obtaining the Ideal Job 3/28/00 8:30pm EST $15.00
☐ CDOC Setting Goals and Sticking to Them 3/31/00 12:00pm EST $15.00
☐ CDOC How to Find the Perfect Job 4/3/00 8:30pm EST $15.00
☐ CDOC Etiquette in the Workplace 4/4/00 3:30pm EST $15.00
Enroll CDOC Power Resume Building Workshop 4/6/00 8:00pm EST Free
Enroll CDOC Time Management Skills 4/7/00 3:00pm EST Free
☐ CDOC Exploring Your Values & Beliefs 4/12/00 8:30pm EST $15.00
☐ CDOC Dealing with Conflict in the Workplace 4/13/00 4:00pm EST $15.00

Fig. 19

• home •• live help •• search •• shopping cart •• contact us • epic learning

◁ My Homeroom
◁ Log Out

⊙ Back

Resume Rescue

Listed below are links to websites devoted to helping you write an award-winning resume and cover letter.

Archaus: Guide to WWW Resume Writing Resources
Proven Resumes
Rebecca Smith's eResumes and Resources
Resume Tutor
Online Resume Databases
Career & Resume Management for the 21st Century
Career Mosaic: Resume Writing Center
Career Lab
Distinctive Documents
Jobsmart Resumes & Cover Letters
Resume'Net
Shawn's Internet Resume Center
Monster.com
Career Magazine: Resume Writing
College Grad Job Hunter: Resumes,Cover Letters and More!
BridgePath
4 Resume

Fig. 21

• home •• live help •• search •• shopping cart •• contact us • epic learning

◁ Back

▷ My Homeroom
▷ Log Out

Events Calendar
Upcoming Workshops
Workshop Descriptions

Presenter Bios
Dr. David Whitfield

Coach Bios
Heather Williams

Resume Rescue

Your resume might not be the tool that lands you that dream job, but it can be the tool that gets you in the door for an interview. By taking the time to research your field, knowing what skills companies are looking for, knowing your skills and qualifications, and being able to put those into an effective resume you can set yourself apart from the competition.

There are many different options when it comes to formatting your resume. The three most commonly used formats are: chronological, functional, and combination.

I. A chronological resume highlights history of employment and employment experiences. It is best used by people who have had a consistent employment history and whose employment objectives relate to their past experiences.

II. A funtional resume highlights specific skills, accomplishments and experiences without emphasizing dates and places of employment. This style works well with career changers, but it can cause employers to be skeptical about the person's employment history.

III. For the majority of Epic Learning's students, a combination resume will work best. This format inlcudes sections that emphasize skills, experiences, qualifications and employment history.

The following is meant to offer suggestions for the content of your combination resume. Most current word processing programs have resume wizards or templates that can assist you in formatting your resume. If you do not have access to a word processing program at home or at work, you can come to any of our learning centers and use the Microsoft Word's resume wizard.

Name: Somewhere at the top of your resume should be your name, address, phone number and email address (note a hint from Eric, a local recruiter, "Many computer scanners look for area codes based on the geographic region of the opening. Make sure that you use an area code that will not automatically knock you out of contention")

Professional Summary: Your professional summary should detail the experience you have that relates to the job you are submitting your resume for. If you do not have experience in the IT field, you can title this section as Qualifications Summary and highlight those universal skills you have developed over your lifetime that every employer wants to see.

Fig. 22

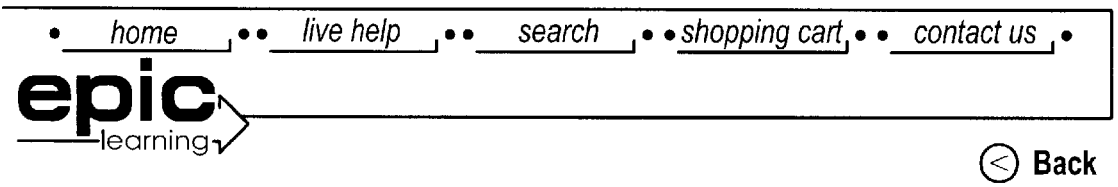

Job Search Sites

We have rounded up some of the best job search sites on the web and put them in one convenient place for our students.

Surf-IT
Town Online
Techies.com
Vault Reports
Wall Street Journal Career Center
America's Job Bank
Nation Job Network
E-SPAN Job Options
Career City
Career Exchange
Career Mosaic
Career Path
DICE
GISC
HeadHunters
Job Bank USA
Job Factory Online
Knowledge Access International
KENDA Systems
Preferred Jobs
Select Jobs
The Monster Board
Net-Temps
Job Quest
Computer Jobs
Job Online
Atlanta Technical Support
Granthem Penek
Web Staff
Oracle Job Network

Fig. 23

• home •• live help •• search •• shopping cart •• contact us • epic learning

⊲ My Homeroom
⊲ Log Out

⊘ Back

Use these sites to find information that will help you make a decision on what companies you would want to work for before you apply for a job or go to an interview.

Events Calendar
Upcoming Workshops
Workshop Descriptions

Presenter Bios
Dr. David Whitfield

Coach Bios
Heather Williams

AmericanCompanies.com

BigYellow.com

CareerPath.com

Fortune.com

Monster.com

Netscape.com

Switchboard.com

Vault.com

Yahoo.com

Fig. 24

• home •• live help •• search •• shopping cart •• contact us • epic learning

◁ My Homeroom
◁ Log Out

Events Calendar
Upcoming Workshops
Workshop Descriptions

Presenter Bios
Dr. David Whitfield

Coach Bios
Heather Williams

Recommended Reads  ⊙ Back

Need help figuring our your next career move? Want to become a better leader and motivator? Here are some of the best selling books on career related topics.

| |
|---|
| What Color is Your Parachute? 1999: A Practical Manual for Job-Hunters & Career-Changers (Paper) |
| I Could Do Anything if I Only Knew What it Was |
| The Three Boxes of Life and How to Get Out of Them: An Introduction To Life-Work Planning |
| Rites of Passage at $100,000 +: The Insiders Lifetime Guide to Executive Job-Changing and Faster Career Progress |
| Leadership Moment: Nine True Stories of Triumph and Disaster and Their Lessons for Us All |
| The Leaders Guide: 15 Essential Skills (Psi Successful Business Library) |
| Success is a Choice: Ten Steps to Overachieving in Business and Life |
| Mastering the Art of Creative Collaboration (Businessweek Books) |
| How to Be a Star at Work: Nine Breakthrough Strategies You Need to Succeed |
| Live the Life You Love: In Ten Easy Step-By Step Lessons |
| Its Only Too Late if You Do Not Start Now: How to Create Your Second Life After Forty |
| Zen and the Art of Making a Living: A Practical Guide to Creative Career Design |
| The Pathfinder: How to Choose or Change Your Career for a Lifetime of Satisfaction and Success |
| Smart Choices: A Practical Guide to Making Better Decisions |
| Never Be Lied to Again: How to Get the Truth in 5 Minutes or Less in Any Conversation or Situation |

Fig. 25

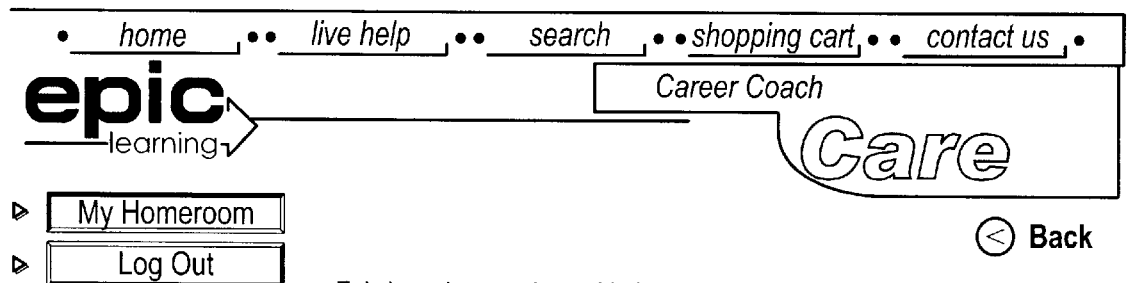

- home •• live help •• search •• shopping cart •• contact us •

Career Coach

▷ My Homeroom
▷ Log Out

◁ Back

Epic Learning.com has added a new service to aid members in their personal and professional development. Beginning in January 2000, members will have access to a Career Coach who can help them with issues such as determining a career path, resume development, interviewing successfully, stress management, etc.

Events Calendar
Upcoming Workshops
Workshop Descriptions

Presenter Bios
Dr. David Whitfield

Coach Bios
Heather Williams

Your Career Coach is available in a variety of ways. First, a series of workshops are available to members. Several workshops are scheduled each week and are focused on management and personal growth issues, in addition to on-the-job concerns. Members will discover a variety of useful workshops, regardless of their stage of career development. Click here to view schedule.

Members may also obtain career counseling via chat sessions. These chat sessions are scheduled weekly and cover a broad range of topics. Both topical chat sessions where members are encouraged to ask questions within a given subject matter and general career advice chat sessions are available. Click here to view schedule.

Members can also receive career advice through email. If you have a specific question or concern, you can email careerservices@epiclearning.com, and a Career Coach will respond to your issue within one business day.

Finally, if a Member prefers to discuss a career issue directly with a Career Coach, they may e-mail careerservices@epiclearning.com and request a phone consultation. The Career Coach will then schedule a session with the member and will call the member at the scheduled time.

It is our hope that by providing Epic Learning.com members with these resources, we will be helping them achieve more fullfilling and rewarding careers. If you have suggestions on how we can better accomplish this goal, please email us at the above address.

Fig. 26

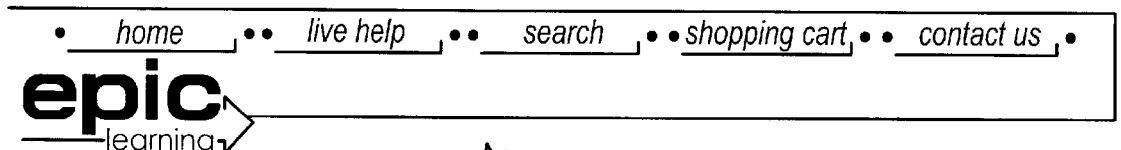

PerfectAgent.
Online Resume Building Service

Epiclearnng.com is introducing an exciting new service to our Online Community. As an Epiclearning.com Member, you can now build an online Resume( eRes )from your Homeroom! You'll be able to build a complete portfolio that showcases your career objectives, past experiences, skills, work values, and more.

We will be using Perfect Agent software as part of our online resume building service. This robust system offers you much more than most standard resume posting sites. You can:

Enter your desired work accountability
Enter the type of organization you would prefer to work for
Select the size of company you would like to work in
Take an online Professional Skills Assessment
Record a Virtual Interview & include it in your eRes

These tools combined create a powerful online resume that is used to match you to prospective employers based on your work preferences. You will even be able to rate opportunities based on level of interest.

Currently we are in a BETA development phase of the Perfect Agent system and our online resume building service, but we want our Members to begin taking advantage of the system before it is completely operational. You'll help us test the system and get the bugs out and we'll have your resume online and ready to go as we roll out our program to corporations.

This service is absolutely FREE to all Epiclearning.com Members. To start building your online resume now, click here. For more information about this, or other career development services, please contact careerservices@epiclearning.com.

Fig. 27

• home •• live help •• search •• shopping cart •• contact us • epic learning

◁ Back

▷ My Homeroom

Salary Smarts

▷ Log Out

| | |
|---|---|
| The Fourth Annual Salary Survey | by Microsoft Corporation |
| EE Times Online: 1998 Worldwide Salary and Opinion Survey | by CMP Media |
| The 1999 National IT Salary Survey | by Information Week |
| 1999 MIS Compensation Survey | by Positive Support Review |
| Welcome to Datamasters Computer Industry Salary Survey | by Datamasters |
| 1999 Salary Survey & Career Navigator | by Romac International |
| Job Smart Salary Surveys | by Job Star |
| Wage Web Salary Resources | by Wage Web |
| Salary Data & Articles by industry Job Function | by Wall Street Journal |
| Oracle Database Developers: Rotten Channel, Ripe Market | by ZDNet |

Events Calendar
Upcoming Workshops
Workshop Descriptions

Presenter Bios
Dr. David Whitfield

Coach Bios
Heather Williams

Fig. 28 epiclearningdotcom

Chat Now | Need Help? | Expand All | Search | Exit

Sort By: NAME | Date | Most Recent

| Key: | ◻ New Article | ◻ File Attachments | ◇ Read Only | ◻ Moderated | ◻ Password Protected |

| Forum Name<br>*Description* | Articles<br>Forum/Total |
|---|---|
| Career Center | 35/35 |
| ⊞ Desktop | 0/0 |
| Emerging Technologies | 4/4 |
| HTML 4.0 | 4/4 |
| Internet Business Essentials | 2/2 |
| Introduce Yourself<br>*A great place to start...* | 2/2 |
| ⊞ Microsoft Technical | 6/140 |
| Networking Essentials | 3/3 |
| ⊞ Novell | 0/16 |
| Oracle | 5/5 |

Fig. 30

• home •• live help •• search •• shopping cart •• contact us • epic learning

Finance It
Invest in yourself

▷ I.T. Certifications
▷ Desktop Training
▷ WebPro Series
▷ Full Course Catalog
▷ Corporate Learning
▷ Finance It
▷ About Membership
▷ About Epic

Ask about Financing!

About Financing ◁ Back

More information about Financing

Developing your career skills is one of the most important things you can do to invest in your future. At Epic Learning, we are constantly searching for ways to make our programs affordable and accessible to our members.

We want to help you finance your education, rather you decide to get your skills training with us, or another training program. Our goal is to make it possible for anyone, regardless of their skill level, amount of free time or financial wherewithal, to gain the knowledge, skills and experience they need to become technology professionals.

Becoming a Microsoft Certified Systems Engineer is a big step towards increasing your marketability, skill set and career avenues. Epic Learning can help you finance our Online MCSE Certification program, as well as our other IT training programs.

Current Options

After you click on the following link for more information, you will fill out a form that will give us information that we need to help you through your application process. After you submit this form you will then link to a page of information about Keybank financing options.

Fig. 31

• home •• live help •• search •• shopping cart •• contact us • epic learning move

Welcome to the Microsoft Knowledge Area

▷ My Homeroom
▷ Log Out

Need an answer?
...ask your Coach!
Microsoft Technical ▼

GO!

training plans
MCSE Live Online
MCSE Plus I Live Online

Download CBTs to your home computer (LODs)

seminars
Planning for Windows NT 4.0 Deployment
NT & Novell Netware Interoperability
WINS Replication
Networking & Remote Access Services (RAS)
(new) Microsoft Online Seminars learning resources
Microsoft Resource Links
MCSE Test Prep Sites
IT Publications
General Information Sites
(new) Dump2Exam
(new) Windows NT Frequently Asked Questions
(new) Topacio Braindumps getting started
Microsoft Online Program Getting Started Info i-led schedule

Before Attending, Click Here for Setup Info
If you are enrolled, click on the class to attend. If you are not enrolled, click on the class to enroll.

| Next 10 Instructor-Led classes scheduled for your Training Plans: | Status |
|---|---|
| Step 2 MOIL Installing NT 1/13/00 4:00pm EST | Enrolled |
| Step 3 MOIL Sharing & Permissions 1/19/00 7:00pm EST | Enrolled |
| Step30 MOIL TCP/IP Basics 1/13/00 10:00pm EST | Open |
| Step 2 DOIL Creating and Formatting a Document 1/14/00 1:00pm EST | Open |
| Step 9 MOIL Monitoring & Optimization 1/16/00 5:00pm EST | Open |
| Step 17 MOIL How Networks Work 1/17/00 10:00am EST | Open |
| Step 8 MOIL NT Printing 1/17/00 1:00pm EST | Open |
| Step 6 MOIL Sharing & Permissions 1/17/00 10:00pm EST | Open |
| Step 11 MOIL Troubleshooting 1/18/00 10:00pm EST | Open |
| Step 18 MOIL Large Networks 1/19/00 10:00am EST | Open |

Fig. 34

- home •• live help •• search •• shopping cart •• contact us • epic learning

▷ My Homeroom
▷ Log Out

Need an answer?
...ask your Coach!
Microsoft Technical ▼
GO!

Mike's MCSE Live Online Training Plan (6/11/99 to 6/10/00)

training plans

▷ View all Courses
▷ View all Courses to be Completed
▷ View all Completed Courses
▷ View all CBT Assignments
▷ View all Reading Assigments
▷ View all Lab Assignments
▷ View all Online Instructor Led Classes
▷ View all Self-Study Assignments
▷ View all Practice Exams
▷ View all Archived I-Led Classes View by Exam Take Workstation Exam
Take Server Exam
Take Networking Essentials
Take Server in the Enterpris
Take TCP/IP Exam
Take IIS 4 Exam

Fig. 35

MCSE Online Training Plan-Exam View

▷ My Homeroom
▷ Log Out

◁ Back

| Step | Task To Do | Task Type | Action | Done ? | Comments |
|---|---|---|---|---|---|
| 30 | Internetworking MS TCP/IP MS Win NT 4.0 Part 1 | CBT | Assignment | Not Done | My Note |
| 30 | MOIL TCP/IP Basics | Online Instructor Led | Go Enroll | Not Done | My Note |
| 30 | New Riders TCP/IP TG Lab-1 | Lab | Assignment | Not Done | My Note |
| 30 | New Riders TCP/IP TG-1 | Reading | Assignment | Not Done | My Note |
| Step | Task To Do | Task Type | Action | Done ? | Comments |
| 31 | Internetworking MS TCP/IP MS Win NT 4.0 Part 2 | CBT | Assignment | Not Done | My Note |
| 31 | MOIL DHCP/WINS | Online Instructor Led | Go Enroll | Not Done | My Note |
| 31 | New Riders TCP/IP TG Lab-2 | Lab | Assignment | Not Done | My Note |
| 31 | New Riders TCP/IP TG-2 | Reading | Assignment | Not Done | My Note |
| Step | Task To Do | Task Type | Action | Done ? | Comments |
| 32 | Internetworking MS TCP/IP MS Win NT 4.0 Part 3 | CBT | Assignment | Not Done | My Note |
| 32 | New Riders TCP/IP TG Lab-3 | Lab | Assignment | Not Done | My Note |
| 32 | New Riders TCP/IP TG-3 | Reading | Assignment | Not Done | My Note |
| Step | Task To Do | Task Type | Action | Done ? | Comments |
| 33 | Internetworking MS TCP/IP MS Win NT 4.0 Part 4 | CBT | Assignment | Not Done | My Note |
| 33 | MOIL Troubleshooting TCP/IP | Online Instructor Led | Go Enroll | Not Done | My Note |
| 33 | New Riders TCP/IP TG Lab-4 | Lab | Assignment | Not Done | My Note |
| 33 | New Riders TCP/IP TG-4 | Reading | Assignment | Not Done | My Note |
| Step | Task To Do | Task Type | Action | Done ? | Comments |
| 34 | Measureup TCP/IP test | Test | Practice | Not Done | My Note |
| 34 | TCP/IP Review | Self-Study |  | Not Done | My Note |
| Step | Task To Do | Task Type | Action | Done ? | Comments |
| 35 | Take TCP/IP Exam | Test | Practice | Not Done | My Note |

Fig. 37

EDUCATIONAL HOMEROOM FOR PROVIDING USER SPECIFIC EDUCATIONAL TOOLS AND INFORMATION

CROSS-REFERENCES TO RELATED APPLICATIONS

This application claims the benefit of U.S. Provisional Application No. 60/157,443, filed Oct. 4, 1999, which is incorporated herein by reference in its entirety.

STATEMENT AS TO ANY INVENTION RIGHTS UNDER FEDERALLY SPONSORED RESEARCH

Not applicable.

FIELD OF THE INVENTION

The present invention relates generally to education, and more particularly, to an Internet based educational homeroom, for providing educational tools and information in accordance with expressed educational interests and needs of a user.

BACKGROUND OF THE INVENTION

With the advancement of technology, improved methods of providing an education are constantly sought. Traditional educational techniques do not provide efficient learning methods. One traditional method of educating is classroom oriented teaching. As is well known, classroom oriented teaching provides a group of students, varying in number, with instruction offered by one or more professors. Conversation during a class is predominantly one directional, with occasional student/teacher interaction in the form of questions and answers. Questions asked by students typically interrupt the progression of topics taught by instructors, while the instructor addresses individual student questions in front of the entire class.

In addition, teaching assistants are occasionally used outside of the classroom setting to enhance the learning experience of the student. Teaching assistants provide a means for students to obtain answers to classroom-related topics, in a setting based outside of the classroom, thereby reinforcing previously taught classroom material.

Unfortunately, classroom oriented teaching is provided at a single pace to which all students are subjected. It is well known that students do not learn at the same pace. Therefore, it is unfortunate that classroom oriented teaching forces all students to learn at the same pace.

Classroom-oriented teaching also requires students to travel for purposes of attending classes. Traveling tends to be inconvenient and, due to conflicts in personal schedules, also leads to classes being unattended, which may result in learning inadequacies.

The Internet provides a relatively new medium that may be used for educational purposes. The Internet provides one of the largest assortments of databases and electronic media commonly referred to as the World Wide Web (Web). Web documents may contain graphics, text, sound, video or any combination of these tools. Web documents may also contain "hyperlinks," which are either text or graphical predetermined areas of information located in a document that, when user-selected, open an associated document. Use of these unique tools presently allows students to view and listen to pre-recorded classes that may be provided in association with other learning techniques, such as homework assignments. In addition, the Internet allows students to ask professors questions via electronic mail (e-mail).

While the abovementioned beneficial features of the Internet have been used for educational purposes, they are predominantly used in association with classroom oriented teaching. Further, listening, or viewing, of prerecorded classes does not provide a student with the benefits associated with personal student/teacher interaction during classroom presentations. Therefore, although there has been basic use of the Internet for educational purposes, the full potential of the Internet as an educational tool is yet to be harnessed. Still further, there is a need for a central location through which the full potential of the Internet may be experienced.

BRIEF SUMMARY OF THE INVENTION

In light of the foregoing, the preferred embodiment of the present invention generally relates to a learning system with an educational homeroom for providing educational tools and information to an end-user, or student, in accordance with the end-user's expressed educational interests.

Generally, a fee based educational homeroom, and a non-fee based educational homeroom, are provided, which are predominately similar except for additional end-user tailored features being presented within the fee based educational homeroom. Such tailored features provide the end-user with an educational homeroom that is focused upon Knowledge Areas in which the end-user has expressed educational interest.

The educational homeroom provides the end-user with a central location for obtaining educational information focused upon the Knowledge Area in which the end-user has expressed educational interest. When an end-user expresses educational interest, the homeroom is dynamically changed to reflect the end-user's educational interest such that options made available to the end-user, within the educational homeroom, are always tailored to offer educational tools and information within Knowledge Areas of choice.

The preferred embodiment of the invention has numerous advantages, a few of which are delineated hereafter as examples. Note that the embodiments of the invention, which are described herein, possess one or more, but not necessarily all, of the advantages set out hereafter.

One advantage of the invention is that it provides a centralized learning location that provides numerous educational tools to a student, that are specifically tailored to the student's course of study.

Another advantage is that the invention alleviates the need for traveling to attend classes.

A further advantage is that options made available to an end-user dynamically change in accordance with the expressed educational interests of the end-user.

Other features and advantages of the present invention will become apparent to one of reasonable skill in the art upon examination of the following drawings and detailed description.

BRIEF DESCRIPTION OF THE SEVERAL VIEWS OF THE DRAWINGS

The present invention will be more fully understood from the detailed description given below, and from the accompanying drawings of the preferred embodiments of the invention, which, however, should not be taken to limit the invention to the specific embodiments, but are for explanation and for better understanding. Furthermore, the drawings are not necessarily to scale, emphasis instead being placed upon clearly illustrating the principals of the invention.

Finally, like reference numerals in the figures designate corresponding parts throughout the several drawings.

FIG. 5 is a screen view that illustrates an example of an initial login screen view wherein required fields for entry into the educational homeroom of FIG. 2 are presented.

FIG. 6 is a screen view that illustrates fields required for an end-user to register for an educational homeroom.

FIG. 8 is a screen view that illustrates an example of a fee based educational homeroom.

FIG. 9 is a screen view that illustrates an example of a Microsoft Networking Knowledge Area of the non-fee based educational homeroom of FIG. 7.

FIG. 10 is a screen view that illustrates an example of the Novell Knowledge Area of the non-fee based educational homeroom of FIG. 7.

Figure 11:
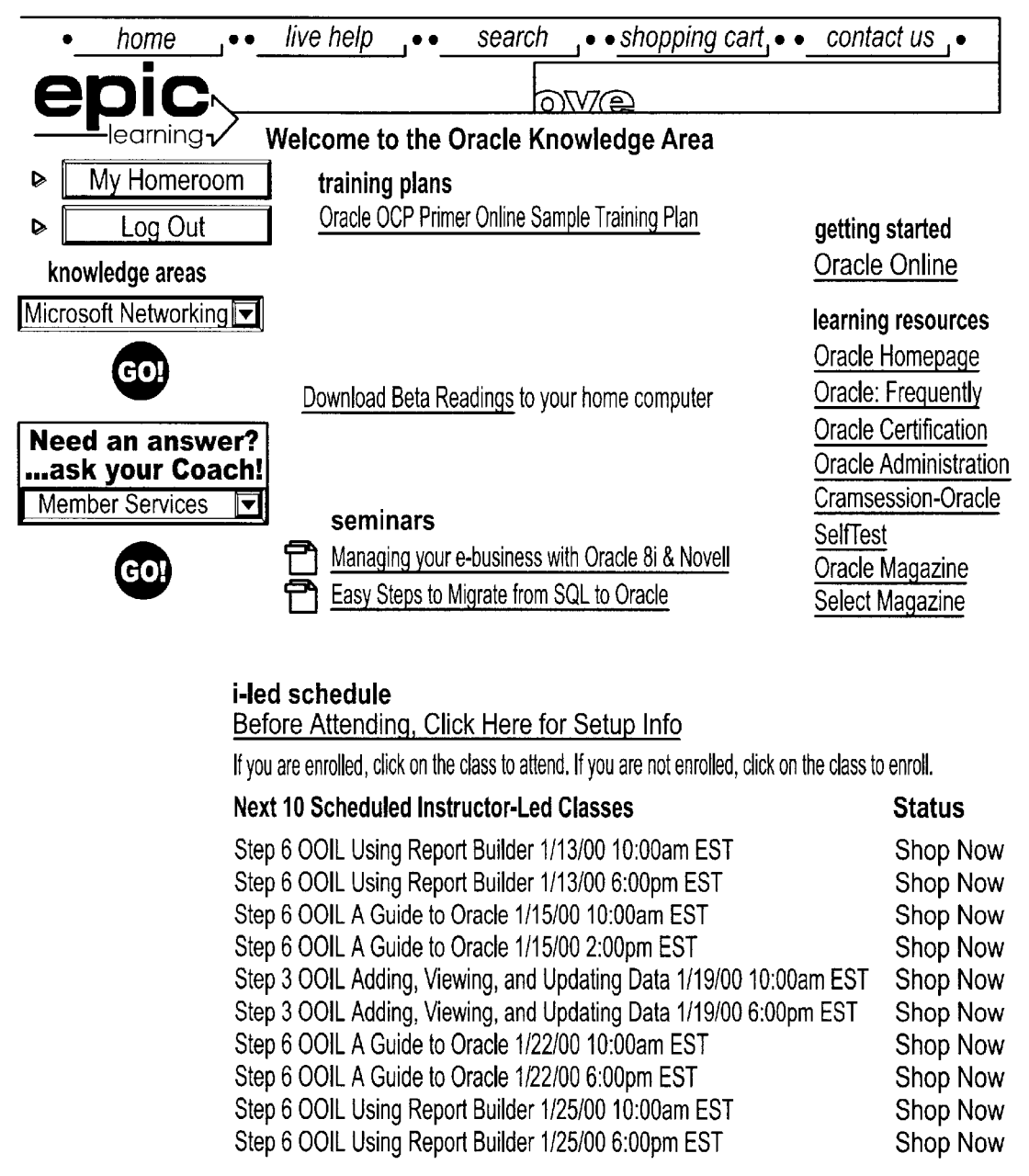

FIG. 11 is a screen view that illustrates an example of the Oracle Knowledge Area of the non-fee based educational homeroom of FIG. 7.

FIG. 12 is a screen view that illustrates an example of the Web Development Knowledge Area of the non-fee based educational homeroom of FIG. 7.

FIG. 13 is a screen view that illustrates an example of the Microsoft Office Knowledge Area of the non-fee based educational homeroom of FIG. 7.

FIG. 14 is a screen view that illustrates an example of a training plan within the Microsoft Networking Knowledge Area of the non-fee based educational homeroom of FIG. 7.

FIG. 17 is a screen view that illustrates a Web page presented to an end-user after selection of a Microsoft Resource Links learning resource topic, within a Learning Resources category of the Microsoft Office Knowledge Area.

FIG. 19 is a screen view that illustrates a Web page provided to an end-user upon selection of a Personal & Professional Workshop Series hyperlink, within a Career Center category of the non-fee based educational homeroom.

FIG. 21 is a screen view that illustrates a Web page provided to an end-user upon selection of a Resume Web Sites selection, within a Career Center category of the non-fee based educational homeroom.

FIG. 22 is a screen view that illustrates a Web page provided to an end-user upon selection of a Resume Advice selection, within a Career Center category of the non-fee based educational homeroom.

FIG. 23 is a screen view that illustrates a Web page provided to an end-user upon selection of a Job Search Sites selection, within a Career Center category of the non-fee based educational homeroom.

FIG. 24 is a screen view that illustrates a Web page provided to an end-user upon selection of a Research Companies selection, within a Career Center category of the non-fee based educational homeroom.

FIG. 25 is a screen view that illustrates a Web page provided to an end-user upon selection of a Recommended Books selection, within a Career Center category of the non-fee based educational homeroom.

FIG. 26 is a screen view that illustrates a Web page provided to an end-user upon selection of a Career Coaching selection, within a Career Center category of the non-fee based educational homeroom.

FIG. 27 is a screen view that illustrates a Web page provided to an end-user upon selection of a Enter Your Online Resume selection, within a Career Center category of the non-fee based educational homeroom.

FIG. 28 is a screen view that illustrates a Web page provided to an end-user upon selection of a Salary Smarts category, within the non-fee based educational homeroom.

FIG. 30 is a screen view that illustrates a Web page provided to an end-user upon selection of a Discussion Forum category, within the non-fee based educational homeroom.

FIG. 31 is a screen view that illustrates a Web page provided to an end-user upon selection of a financing option, within a Member Services category of the non-fee based educational homeroom.

FIG. 34 is a screen view that illustrates an example of a Microsoft Networking Knowledge Area, within the fee based educational homeroom of FIG. 8.

FIG. 35 is a screen view that illustrates a Web page provided to a fee based educational homeroom end-user, upon selection of a Microsoft Certified Systems Engineer live online option, within a training plans selection of the Microsoft Networking Knowledge Area.

FIG. 37 is a screen view that illustrates a Web page provided to a fee based educational homeroom end-user, upon selection of a Transmission Control Protocol/Internet Protocol (TCP/IP) exam option, within the Microsoft Certified Systems Engineer live online training plan Web page of FIG. 35.

DESCRIPTION OF THE PREFERRED EMBODIMENTS

Figure 1:
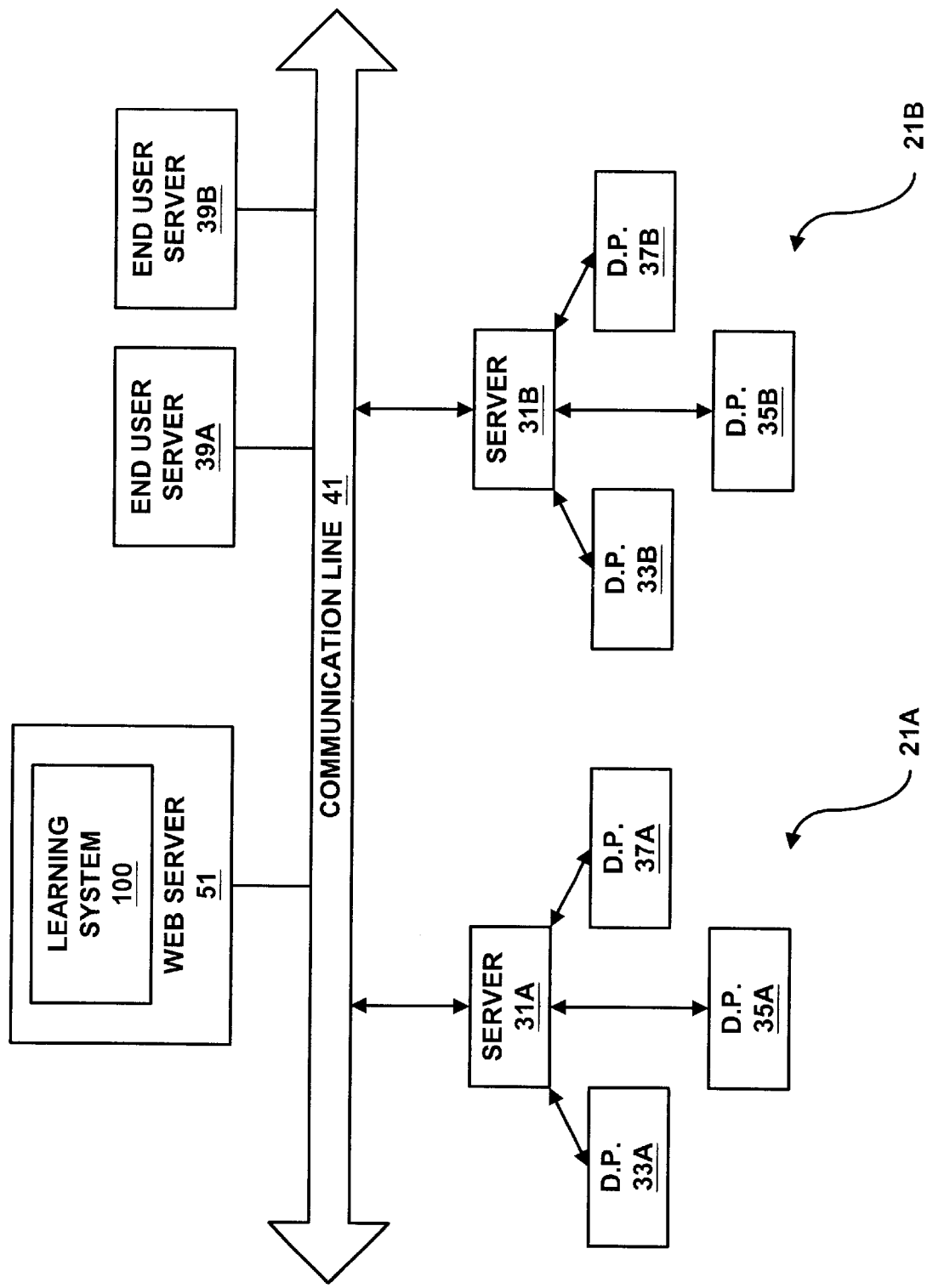
FIG. 1 illustrates a typical Internet based system upon which a learning system with an educational homeroom system of the present invention may be implemented.

The blended learning system of the present invention can be implemented in software, firmware, hardware, or a combination thereof. In the preferred embodiment of the invention, which is intended to be a non-limiting example, the system is implemented in software that is executed by a computer, for example, but not limited to, a personal computer, work station, mini computer, or mainframe computer.

The software-based system, which comprises an ordered listing of executable instructions for implementing logical functions, can be embodied in any computer-readable medium for use by, or in connection with, an instruction execution system, apparatus, or device such as a computer-based system processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

A browser, or "Web" browser, allows for simple graphical user interface (GUI) access to network servers, which support documents formatted as so-called Web pages. The World Wide Web (WWW), or "Web", is a collection of servers on the Internet that utilize a Hypertext Transfer Protocol (HTTP), which is an application protocol that provides users access to files (which can be in different formats such as text, graphics, images, sound, video, etc.) using a Standard Generalized Markup Language (SGML), which is an information management standard for providing platform-independent and application-independent documents that retain formatting, indexing, and linking information. SGML provides a grammar-like mechanism for users to define the structure of their documents and the tags they will use to denote the structure in individual documents. The page description language known as Hypertext Markup Language (HTML) is an application of SGML. HTML provides basic document formatting of text and images and allows the developer to specify hyperlinks, or "links," to other servers and files.

Use of an HTML-compliant client, such as a Web browser, involves specification of an address via a Uniform Resource Locator (URL). Upon such specification, the client makes a TCP/IP request to the server identified in the URL and receives a "Web page" (namely, a document formatted according to HTML) in return. Electronic mail (E-mail) is another important part of online activity. Conventional e-mail is the exchange of text messages and computer files over a communications network, such as a local area network or the Internet, usually between computers or terminals. Routing of e-mail on the Internet is typically accomplished through the use of a protocol for sending messages called the simple mail transfer protocol (SMTP).

By way of example and illustration, FIG. 1 illustrates a typical Internet based system upon which a learning system 100 with an educational homeroom system of the present invention may be implemented. It should be noted that while the present disclosure provides implementation of the learning system 100 with an educational homeroom system within an Internet based system, the learning system 100 with an educational homeroom system need not be provided via use of the Internet. Instead, one of reasonable skill in the art will appreciate that the educational homeroom system may be implemented within other mediums, such as, for example, but not limited to, a local area network.

Referring to FIG. 1, a plurality of networks 21a, 21b are shown wherein each network 21 includes multiple digital processors 33, 35, 37. Digital processors 33, 35, 37 within each network 21 may include, but are not limited to, personal computers, mini computers, laptops, and the like. Each digital processor 33, 35, 37 is typically coupled to a host processor or server 31a, 31b for communication among processors 33, 35, 37 within the specific corresponding network 21.

The host processor or server 31 is coupled to a communication line 41 that interconnects or links the networks 21a, 21b to each other, thereby forming an Internet. As such, each of the networks 21a, 21b are coupled along the communication line 41 to enable access from a digital processor 33a, 35a, 37a of one network 21a to a digital processor 33b, 35b, 37b of another network 21b.

Various end-user servers 39a, 39b, two of which are shown as an example, are linked to the communication line 41, thus providing end-users with access to the Internet. In accordance with the preferred embodiment of the invention, the learning system 100 is preferably provided by a software program that is operated on and connected through a Web server 51, to the Internet for communication among the various networks 21a, 21b and/or digital processors 33, 35, 37 and other end-users connected to the Internet via respective end-user servers 39a, 39b. In accordance with the preferred embodiment of the invention, the Web server 51 runs an Oracle platform to support operation of the present learning system 100. It should be noted, however, that other Web serving platforms may be used in replacement of the Oracle Web serving platform.

Figure 2:
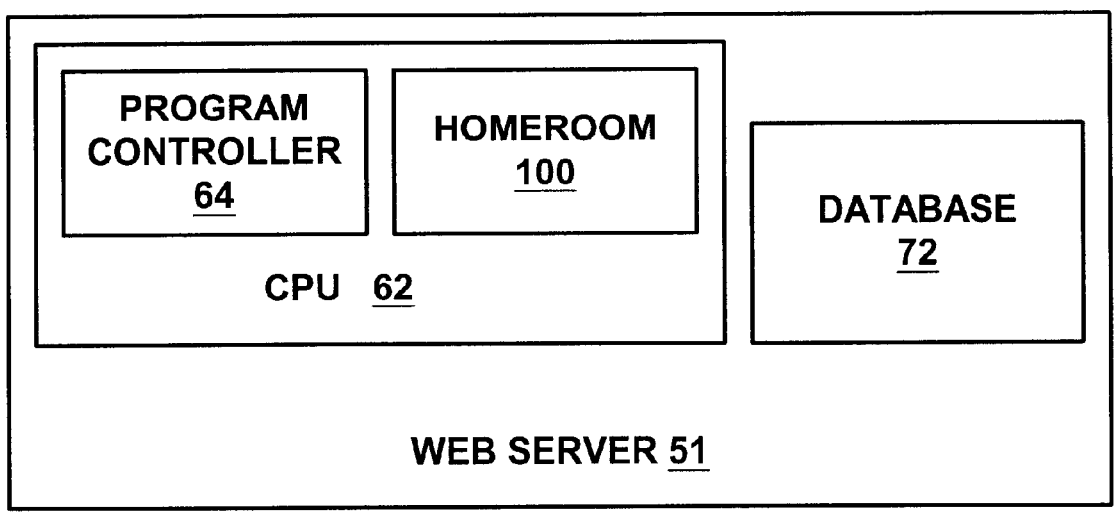
FIG. 2 is a block diagram that further illustrates functionality within the Web server of FIG. 1.

FIG. 2 is a block diagram that further illustrates the Web server 51 of FIG. 1. As shown by FIG. 2, the Web server 51 comprises a central processing unit (CPU) 62 having a program controller 64 and the learning system 100. The program controller 64 is capable of performing functionality required by the learning system 100, as described in detail hereinbelow. The Web server 51 also comprises a Web server database 72, which holds data within a series of tables, as further illustrated by FIG. 3. Data stored within each table is stored within blocks of data cells, wherein blocks of cells are identified by field names, as described in detail hereinbelow. Locating and updating of data, as required by the learning system 100, is performed by the program controller 64. Preferably, the functionality performed by the program controller 64 is made possible via an active server page script that queries the Web server database 72 and tables therein.

While the following describes data location with reference to physically separate tables within the Web server database 72, one of ordinary skill in the art will appreciate that all data may be located within a single table, or arranged in any particular manner within the database 72, including "field" designations and groupings, etc.

Figure 3:
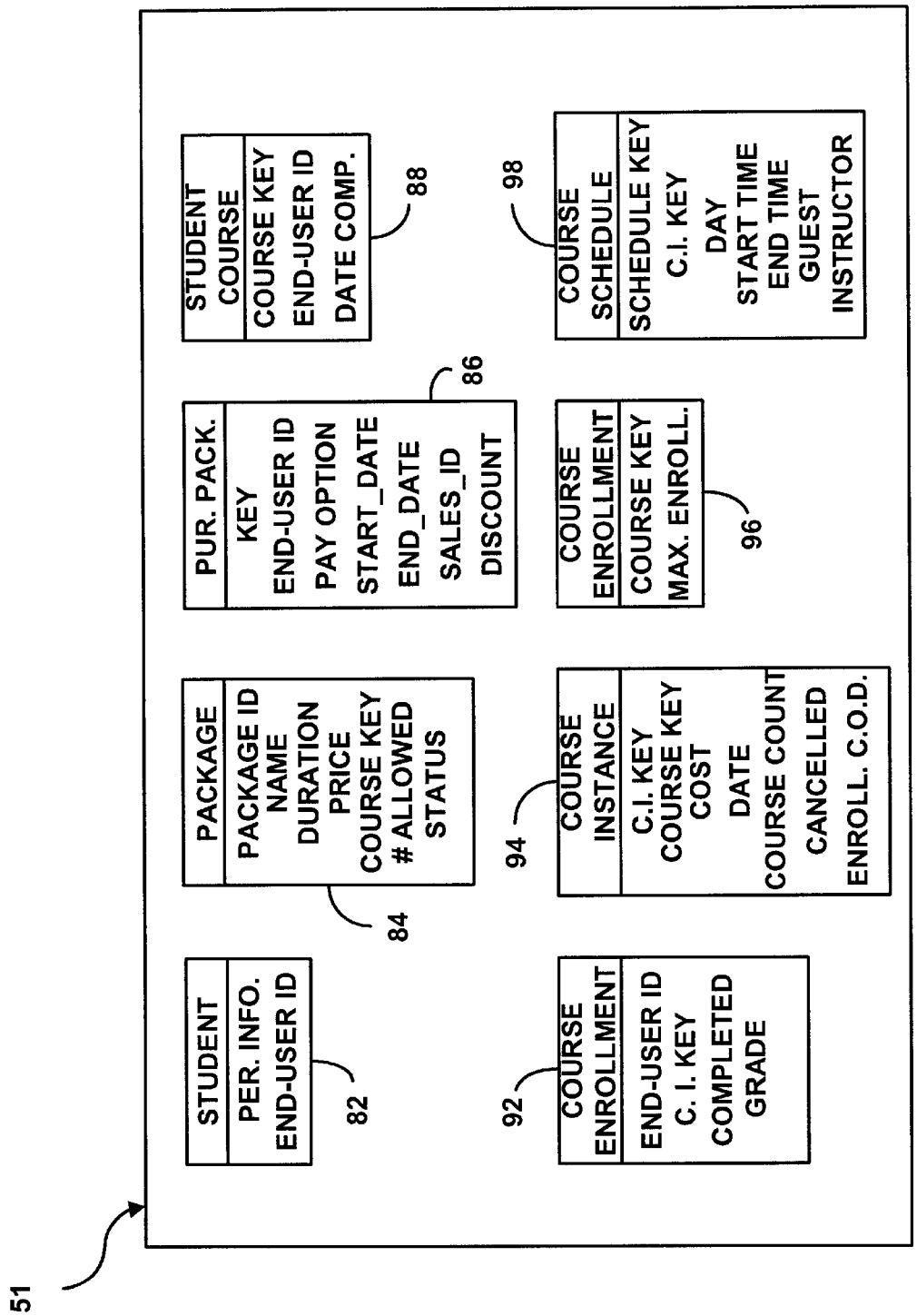
FIG. 3 is a block diagram that illustrates the location of data used in association with the learning system.

FIG. 3 is a block diagram that illustrates the location of data used in association with the learning system 100. It should be noted that while the following description provides location of data within the Web server 51, one of ordinary skill in the art will appreciate that any portion of data may instead be located at a remote server.

A student table 82 is provided within the Web server database 72 (FIG. 2), which stores personal information regarding each registered end-user. A first field used within the student table 82 is a personal information field. Data categorized under the personal information field may include, but is not limited to, the end-user's last name, address, password, email address, etc. A second field used within the student table is a end-user ID field. The end-user ID field stores a personal identification number that is given to each registered end-user, by the learning system 100, for purposes of identification. This method provides a means of tracking educational activities made by the end-user as is further demonstrated hereinbelow.

A package table 84 is also provided within the Web server database 72, which stores information regarding each course offered within an educational homeroom. A first field used within the package table 84 is a package ID field, which identifies a single educational package, or knowledge area, that the end-user may purchase. A name field, duration field, and price field may also be used to identify the educational package.

A fifth field used within the package table 84 is a course key field, which identifies courses used to implement the educational package. As explained hereinbelow, each course is assigned a course key that serves to identify individually offered courses within the educational package.

A sixth field used is a number allowed field, which identifies a maximum number of end-users allowed in the specific educational package. If the maximum number of end-users has been exceeded, a status field may be set to read that the educational package is full and further registration is not allowed.

A purchaser package table 86 is also provided within the Web server database 72, which stores information directed toward educational package purchases made by an end-user. When an end-user purchases an educational package, as described in detail hereinbelow, the program controller 64 updates the purchaser package table 86 accordingly. A first field used within the purchaser package table 86 is a package purchase key field, which categorizes each individual purchase of an educational package, or knowledge area, by an identification number. As an example, if an end-user purchases a Microsoft Networking package and a Web Development package, a different package purchase key identification number identifies each individual purchase.

A second field used within the purchaser package table 86 is an end-user ID field, which identifies the end-user that has purchased the educational package referenced by the package purchase key field. Use of this identification method within the purchaser package table 86 provides a means of determining how many end-users have purchased a particular educational package.

A third field used within the purchaser package table 86 is a pay option field, which identifies the means of purchasing used by the end-user when the learning package, referenced by the first field, was purchased. As an example, if an end-user purchased an educational package by using a debit card, the pay option field may read, credit card. Fields that may be used in unison with the pay option field, may be an account number field, for storing a credit card account number; an expiration date field, for storing the expiration date of the credit card; and a confirmation number field, for storing the confirmation number received after performing a credit card purchase of a particular package.

A fourth and fifth field used within the purchaser package table 86 are the start_date and end_date fields, which identify the duration of time in which the purchased package is made available to the end-user. Preferably, when the end date has arrived, the purchased package is no longer made available to the end-user until such time as the end-user makes an additional purchase.

A sixth field used within the purchaser package table 86 is a sales_ID field, which provides a location to record an identification number of the sales agent who assisted in the purchase of the particular educational package.

A seventh field used within the purchaser package table 86 is a discount field, which provides a location to record any discount received by the end-user in purchasing the educational package. Therefore, the discount field may be used to determine if proper payment for a package purchase has been received.

A student course table 88 is also located within the Web server database 72. The student course table 88 stores information regarding particular courses taken and completed by the end-user. A first field used within the student course table 88 is a course key field, which identifies a single course within an educational package by an identification number. A second field used within the student course table 88 is an end-user ID field, which, identifies the end-user that has completed the educational course referenced by the course key field. Finally, a date completed field is used within the student course table 88, which identifies the completion date of the specific course identified by the course key. Use of the student course table 88, provides a means of monitoring the courses completed by an end-user, and the actual dates of completion.

A course enrollment table 92 is also located within the Web server database 72, as shown by FIG. 3. The course enrollment table 92 provides a method of monitoring each course enrolled into by an end-user. A first field used within the course enrollment table 92 is the end-user ID field, which identifies the particular end-user whose course enrollment activities are identified within the course enrollment table 92.

A second field used within the course enrollment table 92 is a course instance key, which identifies the particular course being monitored by the course enrollment table 92. Use of the course instance key field enables monitoring of the number of end-users enrolled in the monitored class, thereby providing a means of determining if a course is full and how many courses in which an end-user has registered.

A third field used within the course enrollment table 92 is a completed field, which identifies the date in which the abovementioned offered course is completed. A fourth field used within the course enrollment table 92 is a grade field, in which a grade received by the end-user after completion of an exam, associated with the abovementioned course, is recorded.

FIG. 3 also shows that a course instance table 94 exists within the Web server database 72. The course instance table 94 stores information regarding each particular instance of a course offered to an end-user. A first field used within the course instance table 94 is a course instance key, which identifies each particular instance of a course by an identification number. A second field used is the course key, which generally identifies a single course that is offered to the end-user, to which, the course instance is a single offering of that course. As an example, if an instructor led course, focusing on networks, is offered to an end-user, a course instance may be a single offering of the course on Tuesday from 7:00 am until 9:00 am, pacific time.

A cost field and date field also exist within the course instance table 94, which serve to further identify the course instance by the cost of the course instance, and the date on which the particular course instance was, or shall be, offered via the learning system 100, respectively. A course count field is also offered within the course instance table 94, which serves to monitor the number of times a particular course has been offered. A cancelled field is used by the course instance table 94 to identify whether the course instance, identified by the course instance key, has been cancelled. Finally, an enrollment cut-off date field is used by the course instance table 94 to identify a cut-off date for allowing registration for the particular course instance, via the learning system 100.

As shown by FIG. 3, a course enrollment limits table 96 also exists within the Web server database 72. Within the course enrollment limits table 96, a course key field is offered, as well as a maximum enrollment field. The combination of the aforementioned fields provides a method of specifying a maximum number of enrollees for a particular course.

A course schedule table 98 is also provided within the Web server database 72. The course schedule table 98 allows specifics regarding an offered course to be assigned and changed for use by the learning system 100. A schedule key field is offered for identifying the specific schedule made available for a specified course instance, which is identified within a course instance key field.

A day field, start time field, and end time field, provide information regarding the day in which the course instance is offered, and the start and end time of that particular instance. The day, start and end time fields also allow the offered time of a course instance to be changed in a relatively simple manner.

Within the course schedule table 98, a guest speaker field and an instructor field are provided, which allow the names of teachers within the above-referenced course instance to be recorded for future reference.

Figure 4:
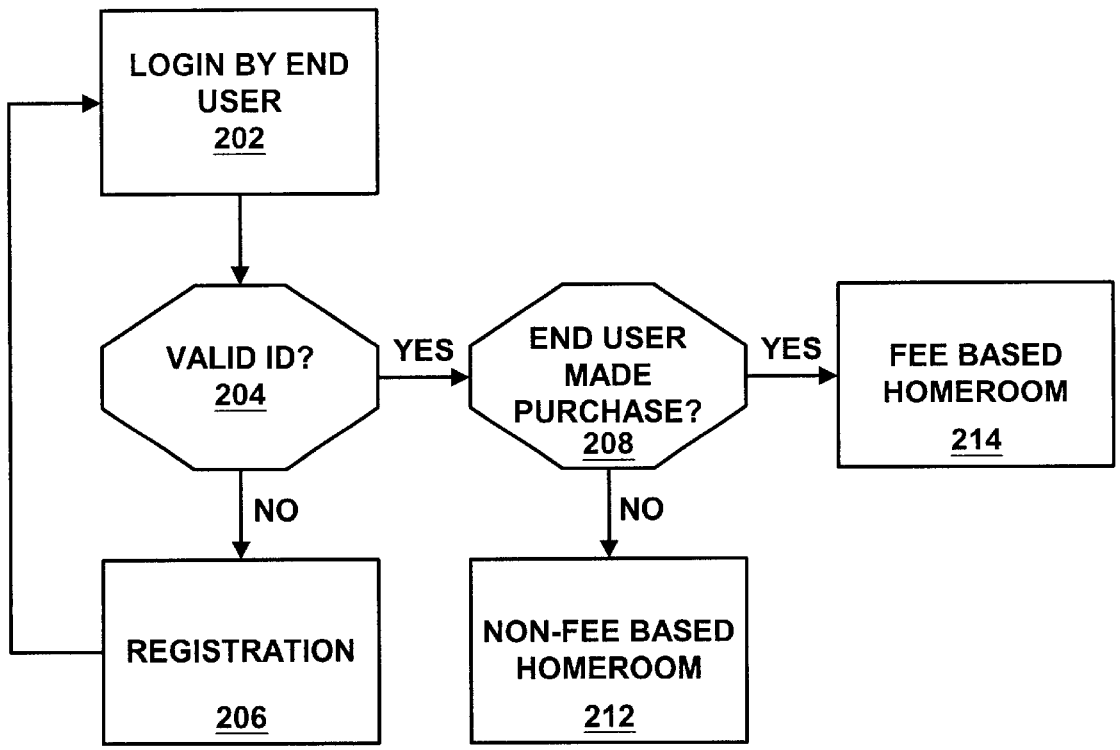
FIG. 4 is a flow chart illustrating the architecture, functionality, and operation of one example of a login procedure for entering the educational homeroom of the preferred embodiment of the invention.

FIG. 4 is a flow chart illustrating the architecture, functionality, and operation of one example (non-limiting example) of a login procedure for entering the learning system 100 with an educational homeroom of the preferred embodiment of the invention. With regard to the flow chart of FIG. 4, each block represents a module, segment, or portion of code, which comprises one or more executable instructions for implementing the specified logical function (s). It should also be noted that in some alternate implementations, the functions noted in the blocks may occur out of the order noted. For example, two blocks shown in succession may in fact be executed substantially concurrently, or the blocks may sometimes be executed in the reverse order, depending upon the functionality involved.

Figure 5:
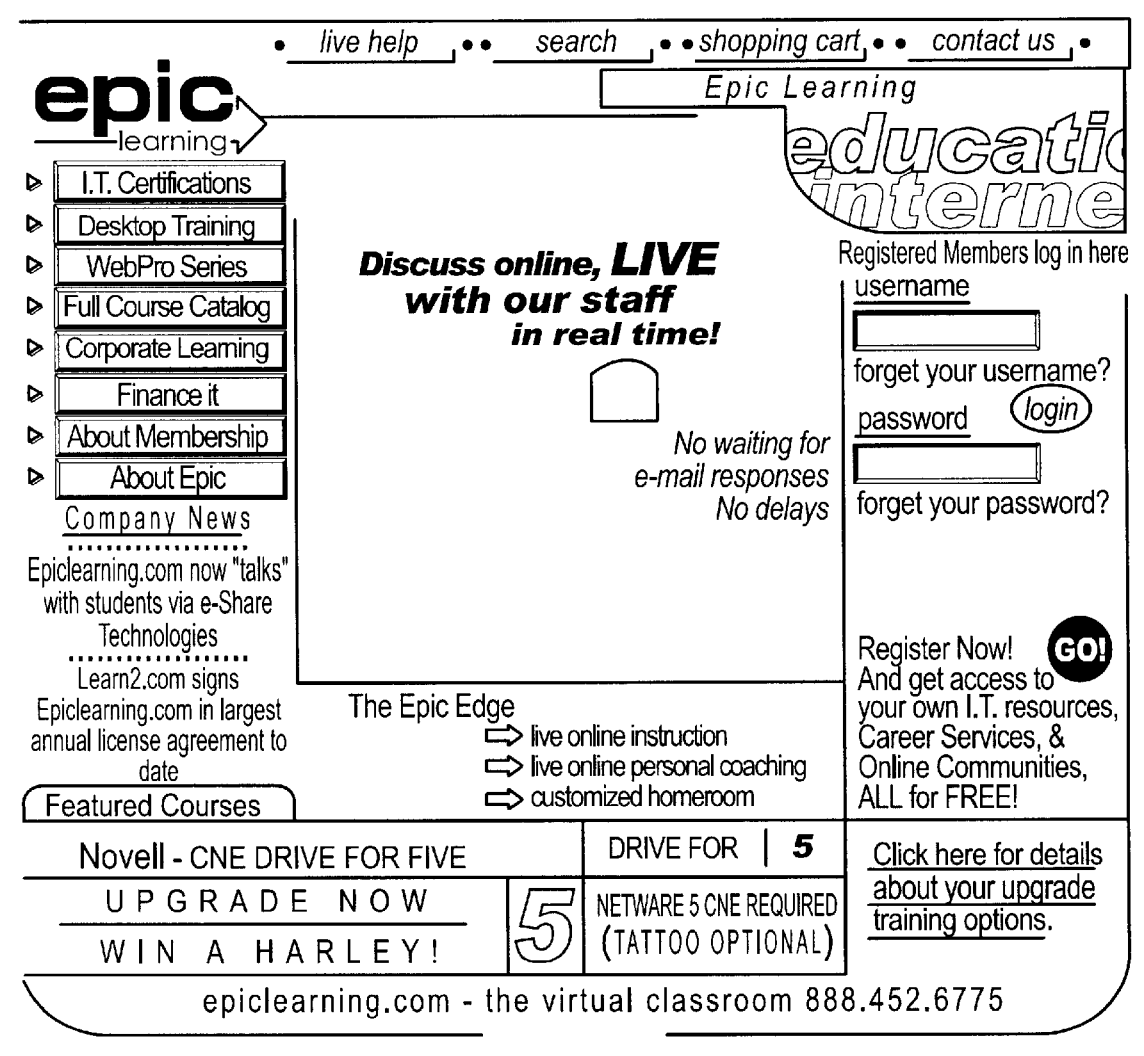

Referring to FIG. 4, as shown by block 202, for an end-user, or potential student, to access the learning system 100, the end-user is required to log in from an initial login screen view. Preferably, the end-user is required to provide both a user name and password. FIG. 5 provides an example of an initial login screen view wherein fields for the entry of a user name and password are presented.

As shown by block 204, when an end-user submits a username and password, the learning system 100 with an educational homeroom, via the program controller 64 of FIG. 2, determines whether the end-user has submitted a valid user name and password. Preferably, the program controller 64 determines end-user validity by searching the student table 82 of the Web server database 51.

As shown by block 206, if an end-user does not have a required user name or password, the end-user may select to register, thereby acquiring a user name and password. FIG. 6 is an example of a screen view that illustrates fields required for the registration of an end-user. Required fields may include a first name, last name, and e-mail address. Additional required fields may include a login password and a login user name, however, with reference to the preferred embodiment of the invention, the previously entered e-mail address is used as the login user name. Further required fields may include confirmation of the password, the home country, phone number, and/or the end-user's United States zip code. Optionally, a password hint may be entered by an end-user for purposes of reminding the end-user of their password at a future time.

In addition to the required and optional fields of FIG. 6, an end-user may specify whether they would like to receive updates and educational materials pertaining to their expressed educational interest. Methods of an end-user expressing educational interest are described in detail hereinbelow.

As further shown by FIG. 6, either prior to, or after, finalization of the sign-up form, the end-user may reset or submit the form. As known by one of ordinary skill in the art, resetting the form may clear any particular number of the abovementioned fields, or, in the alternative, all fields, within the end-user's Web browser.

In response to submission of the form, the program controller 53, located in the Web server 51, queries the student table 82 of the Web server database 72 to determine if either, the end-user has previously registered for with the learning system 100 with an educational homeroom, or, the email address entered by the end-user has been previously used. If the end-user has not previously registered, and the email address has not been previously used, the program controller 53 provides the end-user with a user name and password which is then stored in the student table 82, of the Web server database 72. The user name and password may be transmitted to the end-user via e-mail, or any other commonly used method of data transmission. The end-user may then log into the learning system 100 with an educational homeroom, as previously described with reference to block 202.

It should be noted that the end-user may chose to bypass the login process from the initial login-screen of FIG. 5 by selecting a "register now" graphical hyperlink, which returns the registration form of FIG. 6 directly to the end-user's browser.

As shown by block 208, when an end-user submits a valid user name and password, the program controller 64 determines whether the end-user has previously expressed educational interest by accessing the Web server database 72. As will be shown hereinafter, educational tools offered by the learning system 100 with an educational homeroom differ in accordance with the expressed educational interests of the end-user. Examples of ways that an end-user may express educational interest may include, but are not limited to, the purchasing of educational tools within specific educational categories, as described in detail hereinbelow, and providing personal information via electronic information surveys.

As shown by block 212, if an end-user has not expressed educational interest, as mentioned hereinabove, and the user name and password are valid, the end-user's Web browser receives a non-fee based educational homeroom. An example of a non-fee based educational homeroom is shown by FIG. 7, and described in detail hereinbelow.

Alternatively, as shown by block 214, if an end-user has previously expressed educational interest, the end-user Web browser receives a fee based educational homeroom. An example of a fee based educational homeroom is shown by FIG. 8, and described in detail hereinbelow.

Non-Fee Based Homeroom

Figure 7:
FIG. 7 is a screen view that illustrates an example of a non-fee based educational homeroom.

As shown by FIG. 7, the non-fee based educational homeroom is divided into six educational categories. It should be noted that all six educational categories are not necessarily required to provide for the educational environment provided by the non-fee based educational homeroom, but instead, any number of the six educational categories may be implemented.

Knowledge Areas

In accordance with the preferred embodiment of the invention, the non-fee based educational homeroom, among other categories, provides a knowledge area category for selection by an end-user. The knowledge area category allows an end-user to select between a predefined number of educational categories that are presented as hyperlinks. The educational categories described hereinbelow are focused on providing the end-user with thorough knowledge within a particular technical area. Such knowledge may assist the end-user in preparing to take a required certification examination. It should be noted that, while there are five areas of technology listed below, technologies taught by an educational homeroom may be focused on different areas of technology.

As illustrated by FIG. 7, knowledge areas provided by the non-fee based educational homeroom may include, but are not limited to, Microsoft Networking, Novell Networking, Oracle Database Administration, Web Development, and Microsoft Office. As known by one of ordinary skill in the art, any number of educational categories may be provided within the Knowledge Areas category.

For purposes of providing an example, selection of the Microsoft Networking knowledge area hyperlink, within the non-fee based educational homeroom, returns a Microsoft Networking knowledge area Web page to the end-user's Web browser. An example of the Microsoft Networking knowledge area is shown by FIG. 9. In accordance with the preferred embodiment of the invention, the Microsoft Networking knowledge area provides a predefined list of categories for selection by the end-user that is tailored to provide educational assistance pertaining to the area of Microsoft networking.

It should be noted that while the following is a detailed description of the categories provided for selection by an end-user that has selected the Microsoft knowledge area, category titles for different knowledge areas are substantially the same. Further examples of knowledge area Web pages are shown by FIGS. 10–13, which represent the Novell, Oracle, Web Development and Microsoft Office knowledge areas respectively.

One of the categories provided within the Microsoft knowledge area is a Training Plans category. The Training Plans category provides the end-user with an assortment of training plans that are focused on improving the end-user's knowledge within the selected knowledge area. Therefore, in accordance with the current example, training plans provided to the end-user after selection of the Microsoft knowledge area are focused on improving the end-user's knowledge within the Microsoft knowledge area. Particular to the non-fee based educational homeroom, the Training Plans category provides samples of training plans pertaining to the Microsoft Networking area, however, in accordance with the preferred embodiment, the training plans are not accessible until the end-user expresses educational interest. As shall be described in detail hereinbelow, once an end-user expresses educational interest within a particular knowledge area, the Training Plan category is dynamically changed to offer training plans focusing on the expressed educational field of interest.

The complexity and nature of training plans provided to an end-user may vary in accordance with the number of educational tools utilized by the training plan. Examples of such educational tools may include, but are not limited to, computer-based training, on-line instructor-led classes, reading assignments, lab assignments, archived classes, tests, and other learning methods. The abovementioned educational tools are further discussed in detail hereinbelow with reference to a fee based educational homeroom.

Due to the nature of the non-fee based educational homeroom, namely, the end-user's lack of expressing educational interest, the Training Plans category merely provides a sample of a training plan within the Microsoft knowledge area, a sample screen view of which is shown by FIG. 14. As illustrated, the training plan may be divided into the categories "step," "task to do," "task type," and "action," each of which are described in detail with reference to the fee based educational homeroom described hereinbelow.

Figure 15:
FIG. 15 is a screen view that illustrates a Microsoft Online Seminar Web page provided within a Seminar category of the Microsoft Office Knowledge Area.

A second category offered to the end-user for selection within the Microsoft Networking knowledge area of the non-fee based educational homeroom, is a Seminars category. In accordance with the preferred embodiment of the invention, the Seminar category provides an assortment of hyperlinks that link to seminars that may assist in providing the end-user with knowledge in the selected knowledge area. Particular to the Microsoft Networking knowledge area, the Seminar category provides a list of seminars focused on the topic of Microsoft Networking. Offered seminars may be, but are not limited to, real time video classes, pre-recorded video classes, or slide shows. In addition, the seminars may be provided via local networking or may be received via the Internet from an external Web server. FIG. 15 is an example of a screen view provided to the end-user's Web browser when an end-user selects a seminar hyperlink, namely, a link to Microsoft Online Seminars.

A third category offered to the end-user, for selection within the Microsoft Networking knowledge area of the non-fee based educational homeroom, is an instructor led (I-led) schedule category. The I-led category presents to the end-user a schedule of I-led classes into which the end-user may enroll. Preferably, each listed I-led class is followed by a status field in which information is listed regarding whether or not the end-user has registered for the I-led class. If the end-user has registered for the I-led class, the status field may read "enrolled," while the status field for non-registered I-led classes may read "shop now," or "not enrolled." Preferably, the end-user of the non-fee based educational homeroom is provided with the option to "shop now," since no purchases have been made.

Figure 16:
FIG. 16 is a screen view that illustrates a Web page containing an I-led listing that may be returned to an end-user's Web browser upon selection of a "shop now" option, within an I-led schedule category of the Microsoft Office Knowledge Area.

If the end-user wishes to register for an I-led class, they may do so by selecting the "shop now" option, which is presented as a hyperlink. Selection of the "shop now" hyperlink returns to the end-user's browser a listing of available online classes into which the end-user may register. FIG. 16 is a screen view providing an example of an I-led listing that may be returned to an end-user's Web browser upon selection of the "shop now" option. Preferably, the price of each I-led course is listed adjacent to the I-led course.

In accordance with the preferred embodiment, enrollment into an I-led class is made possible by the end-user purchasing an educational course offered within the homeroom. An example of a possible utility used in the implementation of an I-led class is Placeware® offered by Placeware. Placeware is a browser-based application that is used to launch live synchronous training rooms from which an instructor may teach a class. While teaching, instructors may use such teaching tools as prepared slides, internet protocol audio, live Web pages, polling slides, live software demonstrations, whiteboards, or text slides. I-led classes may be offered from a remote or local site, via a remote or local server, thereby providing classes that may be attended by the end-user, regardless of location. It should be noted that the abovementioned list of utilities are offered as examples and are not intended to limit utilities which may be used by an instructor in an I-led class.

A fourth category presented to the end-user for selection within the Microsoft Networking knowledge area of the non-fee based educational homeroom is a Learning Resources category. In accordance with the preferred embodiment of the invention, the Learning Resources category provides a list of subjective hyperlinks to the end-user, which are named in accordance with the type of resource to which the hyperlink is linked. When a specific hyperlink is selected, the end-user's Web browser receives a Web page that is focused on learning resources particularly relevant to the hyperlink topic selected, thereby providing the end-user with the opportunity of receiving further information within the selected knowledge area.

The returned Web page comprises therein a thorough list of hyperlinks to Web pages located on the Internet, or otherwise, that are related to the user selected learning resource category. An example screen view of the Web page presented to the end-user after selection of a Microsoft Resource Links learning resource topic is shown by FIG. 17.

Figure 18:
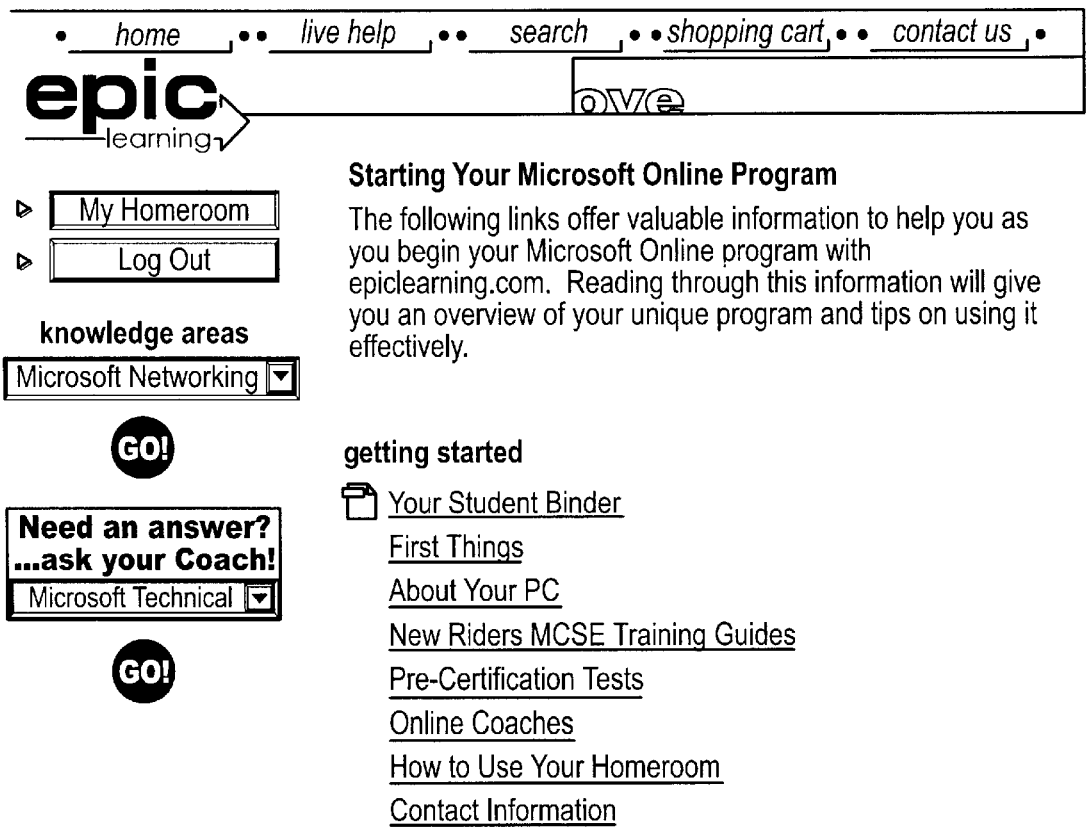
FIG. 18 is a screen view that illustrates a Web page presented to an end-user after selection of a Microsoft Online Program topic, within a Getting Started category of the Microsoft Office Knowledge Area.

A fifth category offered to the end-user for selection within the Microsoft Networking knowledge area of the non-fee based educational homeroom is the Getting Started category. The Getting Started category provides information that is specific to the Knowledge Area selected by the end-user. Information within the Getting Started category is provided to the end-user as a list of hyperlinks to documents that are tailored toward explaining how to best benefit from the Knowledge Area selected by the end-user. An example screen view of a Web page presented to the end-user upon selection of the Microsoft Online Program topic, is shown by FIG. 18.

In accordance with an alternative embodiment, the Getting Started category may be provided to an end-user for a predefined time period that starts after the end-user has expressed an educational interest. As an example, if an end-user purchases an I-led course within the Microsoft Networking knowledge area, the Getting Started category may provide hyperlinks to introductory information tailored to starting a Microsoft networking program.

In addition to the abovementioned Knowledge Area categories provided, the Knowledge Area Web page also provides a link for the end-user to access Knowledge Area coaches within various Knowledge Areas. Selection of a Knowledge Area coach allows the end-user to ask a coach questions within an assortment of technical areas. Questioning of the coach may be performed via email, live interactive chat, phone or any other means of communication via the Internet or otherwise.

Career Center

Referring back to FIG. 7, the non-fee based educational homeroom further provides a Career Center category. The Career Center category provides the end-user with numerous career tools that are tailored toward assisting the end-user in the selection and maintenance of a career. The Career Center category shown by FIG. 7 presents a list of ten hyperlinks, each of which is linked to a Web page containing resources for the enhancement of the end-user's career. It should be noted, that each of the ten selections within the Career Center category need not be provided, but instead, any number, or arrangement, of different, or the same, selections may be provided to the end-user, thereby still falling within the teachings of the non-fee based educational homeroom.

A first selection provided to the end-user within the Career Center category is Personal and Professional Workshop Series. The Personal and Professional Workshop Series provides the end-user with a hyperlink listing of educational tools needed in order for the end-user to evaluate and develop their career goals. Within this category, multiple workshops may be provided either free, or by purchase only. If an end-user selects a workshop, a listing of the date, time, and applicable cost for the workshop is provided to the end-user, as well as an option to enroll. Workshops may be provided as I-led classes, as previously mentioned with reference to FIG. 16, or as a computer based training (CBT) class. Alternative methods of providing workshops may be substituted and still fall within the scope of the preferred embodiment. FIG. 19 is an example screen view of a Web page provided to the end-user upon selection of the Personal & Professional Workshop Series hyperlink.

Figure 20:
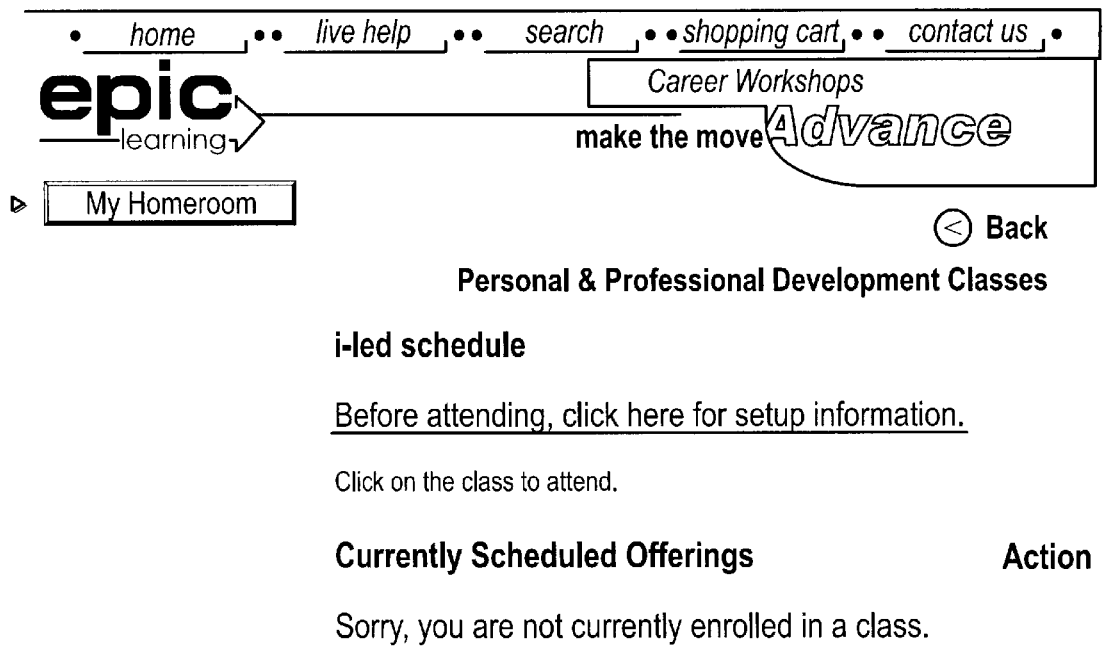
FIG. 20 is a screen view that illustrates a Web page provided to an end-user upon selection of an Enrolled Classes selection, within a Career Center category of the non-fee based educational homeroom.

A second selection provided within the Career Center category is Enrolled Classes. The Enrolled Classes selection provides the end-user with a tabular listing of classes in which the end-user is presently enrolled. It should be noted that selection of the enrolled classes selection will not provide a listing to an end-user that has not expressed an educational interest. Instead, a message expressing the absence of enrolled classes may be provided to the end-user, an example of which is shown by FIG. 20.

A third selection listed within the Career Center category is Career Advice. The Career Advice selection provides a listing of hyperlinks that are linked to articles that focus on career advice. It should be noted that the articles linked to within the Career Advice selection may be stored within the Web server database 72, or they may be stored on an external Web server.

A fourth selection listed within the Career Center category is Resume Web Sites. The Resume Web Sites selection links to a separate Web page that provides a list of hyperlinks to Web sites focusing on providing assistance in the writing of resumes and cover letters. FIG. 21 is an example of a screen view illustrating a Web page that may be received by the end-user's browser upon selection of the Resume Web Sites selection.

A fifth selection listed within the Career Center category is Resume Advice, wherein advice on the writing of professional resumes is provided to the end-user. FIG. 22 is an example of a screen view illustrating an example of a Web page received by the end-user's browser upon selection of the Resume Advice selection.

A sixth selection listed within the Career Center category is Job Search Sites. Choosing the Job Search Sites selection returns a Web page to the end-user's browser which contains a hyperlink listing of job search Web sites.

Selection of a listed job search Web site hyperlink returns the associated Web page to the end-user's browser. FIG. 23 is an example of a screen view illustrating an example of a Web page received by the end-user's browser upon selection of the Job Search Sites selection.

A seventh selection listed within the Career Center category is Research Companies. The Research Companies selection provides the end-user with a Web page having a hyperlink list of research companies. Upon selection, hyperlinks within the Research Companies Web page provide the end-user's browser with a Web page containing information that may assist the end-user in determining information about potential employer companies prior to seeking employment with the companies. FIG. 24 is an example of a screen view illustrating an example of the Web page received by the end-user's browser upon selection of the Research Companies selection.

An eighth selection listed within the Career Center category is Recommended Books. Selection of Recommended Books opens an associated Web page within the end-user's browser in which the end-user may choose from a hyperlink list of reading materials. Such reading materials may include, but are not limited to, books and articles that may assist the end-user in selecting a career. FIG. 25 is an example of a screen view illustrating an example of the Web page received by the end-user's browser upon selection of the Recommended Books selection.

A ninth selection listed within the Career Center category is Career Coaching. Selection of Career Coaching opens an associated Career Coaching Web page within the end-user's browser in which the end-user may choose from services that aid in personal and professional development. Preferably, the service choices presented by the Career Coaching Web page are provided as hyperlinks that are named in accordance with the service to which they link. FIG. 26 is an example of a screen view illustrating an example of the Web page received by the end-user's browser upon selection of the Career Coaching selection.

One option that is provided by the Career Coach Web site is the viewing of a schedule of workshops. In accordance with the preferred embodiment, the workshops are provided in real time and taught by a career coach. In addition, weekly chat sessions are provided as an option to the end-user and are accessible from the Career Coach Web page. Further, the end-user may select to ask the career coach career development questions via e-mail. In addition to the abovementioned options provided by the Career Coaching selection, the end-user may also select to e-mail the career coach via an available hyperlink and schedule a future telephone consultation, wherein further career development questions may be asked and answered.

A tenth selection listed within the Career Center category is Enter Your Online Resume. Selection of Enter Your Online Resume provides the end-user with an associated Web page where the end-user may select from a list of hyperlinks to on-line resume building services. FIG. 27 is an example of a screen view illustrating an example of a Web page received by the end-user's browser upon selection of the Enter Your Online Resume. Within an on-line resume building service, an end-user may be required to enter fields, such as, but not limited to, the desired work accountability, organization type preseference preference, and size of the company for which they would prefer to work. It should be noted that the on-line resume may be readily accessible from the educational homeroom and also may be provided to selected companies in accordance with the Enter Your Online Resume selection.

Salary Smarts

Returning to FIG. 7, the non-fee based educational homeroom also provides a Salary Smarts category. Selection of the Salary Smarts category opens a Salary Smarts Web page within the end-user's browser, where a listing of salary related articles and Web sites are listed in hyperlink format. FIG. 28 is an example of a screen view illustrating an example of a Web page received by the end-user's browser upon selection of the Salary Smarts category.

In addition to hyperlinks directly related to salary related material, the Salary Smarts Web page provides an events calendar where upcoming educational workshops, and workshop descriptions, may be selected. Selection of the upcoming workshops option within the Salary Smarts category, provides the end-user with a hyperlink listing of workshops in a calendar format, to which the end-user may subscribe. In addition, the presenter and coach for each individual workshop are listed. Salary workshops may be provided in I-led format, wherein real time courses are taught by an instructor, and coached by a coach.

Study Rooms

Referring back to FIG. 7, the non-fee based educational homeroom also provides a Study Rooms category. Preferably, the Study Rooms category presents the end-user with a list of study rooms in which the end-user may join. The study rooms provided by the educational homeroom are presented in a chat room format and categorized by specific technologies, such as, but not limited to, technologies disclosed within the knowledge area. As known by one skilled in the art, chat rooms allow end-users to interact using text, such that a first end-user may view text written by a second end-user, either during, or after, the text has been written by the second end-user.

Figure 29:
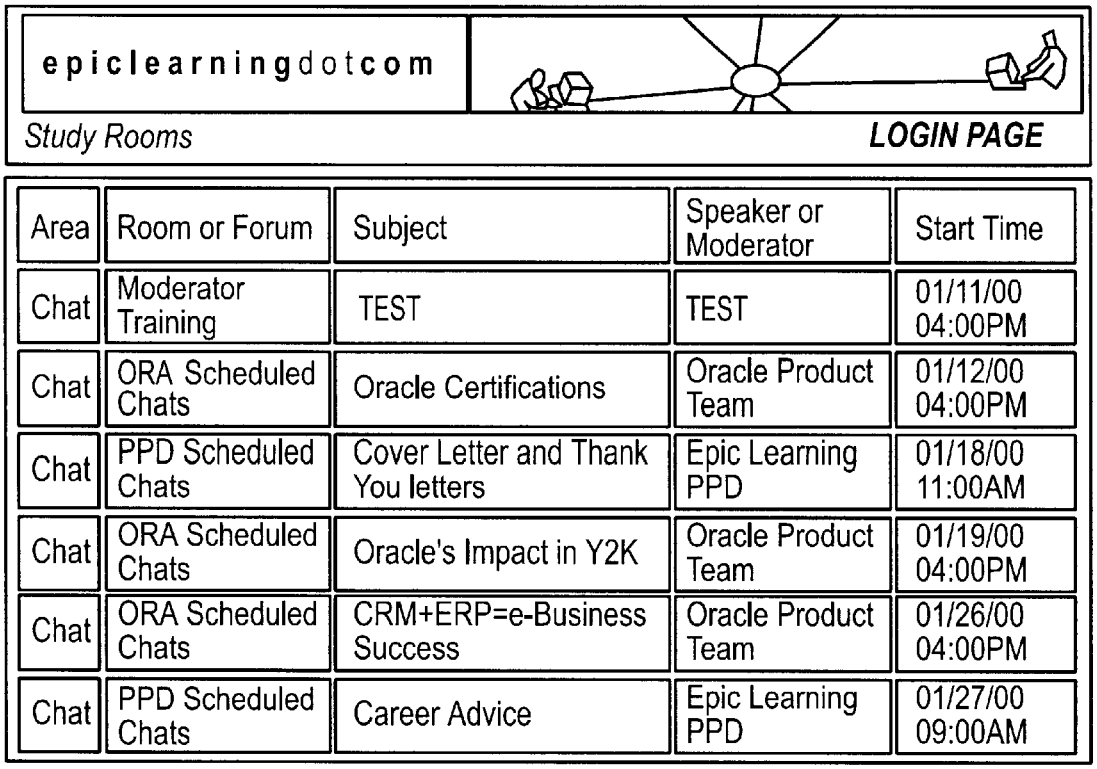
FIG. 29 is a screen view that illustrates a Web page provided to an end-user upon selection of an Upcoming Scheduled Chats selection, within the Study Rooms category of the non-fee based educational homeroom.

As shown by FIG. 7, several choices are provided to the end-user within the Study Rooms category. A first choice provided within the Study Rooms category of the non-fee based educational homeroom is Upcoming Scheduled Chats. Selection of Upcoming Scheduled Chats provides the user's Web browser with a calendar listing of chat rooms that will be hosted by the provider of the educational homeroom. FIG. 29 is a screen view illustrating an example of a Web page received by the end-user's browser upon selection of Upcoming Scheduled Chats. As shown by FIG. 29, an example of a software package that may be used to enable the chat room feature of the educational homeroom is eShare Expressions, version 4.0, by eShare Technologies, Inc.

The following briefly describes other choices provided to the end-user within the Study Rooms category of the non-fee based educational homeroom. A second choice within the Study Rooms category is Introduce Yourself, in which end-users may introduce themselves to other end-users within a chat room. A third choice within the Study Rooms category is Microsoft Technical, in which end-users may discuss technical Microsoft® related topics. A fourth choice within the Study Rooms category is Novell Technical, in which end-users may discuss technical Novell® related topics. A fifth choice within the Study Rooms category is Oracle Technical, in which end-users may discuss technical Oracle® related topics. A sixth choice within the Study Rooms category is WebPro Technical, in which end-users may discuss technical WebPro® related topics. A seventh choice within the Study Rooms category is Desktop Users, in which end-users may discuss desktop computer related topics. An eighth choice within the Study Rooms category is Career Advice, in which end-users may discuss topics related to career advice.

Discussion Forums

Referring back to FIG. 7, the non-fee based educational homeroom also provides a Discussion Forum category. Selection of the Discussion Forum category provides the end-user's Web browser with a Web page that allows the end-user to post articles related to specific group topics. Preferably, topics within the discussion forum are related to topics taught within the knowledge area of the educational homeroom, and are presented as hyperlinks. As an example, a user may select a Microsoft networking forum, wherein the end-user may read articles posted by other end-users concerning Microsoft networking, and reply to such articles. In addition, end-users may be presented with posted questions from coaches or instructors, that may be answered by posting a response on the forum. The posting of questions and answers within a discussion forum allows all end-users to benefit from the technological discussions.

FIG. 30 is a screen view illustrating an example of a Web page received by the end-user's browser upon selection of the Discussion Forum category. As shown by FIG. 30, a total number of articles within each forum may be listed adjacent to the hyperlink for each forum.

Member Services

Returning to FIG. 7, the non-fee based educational homeroom also provides a Member Services category. The Member Services category provides the end-user with a list of hyperlinks that, upon selection, allow the end-user to obtain financial information, change their personal information, and/or change the end-user's educational homeroom password. Upon selection of the financing option, the end-user's Web browser receives a financing Web page that provides the end-user with information for financing their education. FIG. 31 is a screen view that illustrates an example of a Web page received by the end-user's browser upon selection of the financing option.

Figure 32:
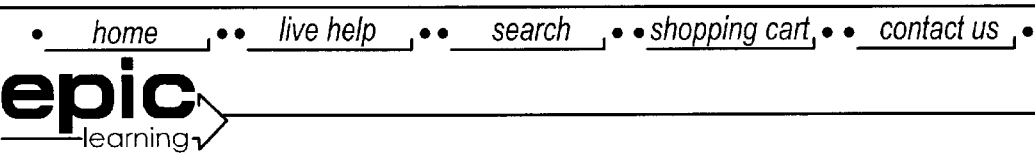
FIG. 32 is a screen view that illustrates a Web page provided to an end-user upon selection of an update personal information option, within a Member Services category of the non-fee based educational homeroom.

Within the member services category of the non-fee based educational homeroom, the end-user may also select to update personal information by selecting the update personal information hyperlink. FIG. 32 is a screen view illustrating an example of a Web page received by the end-user's browser upon selection of updating personal information. Such personal information may include a first and last name, an address, telephone number, or other source of personal information as would be understood by one skilled in the art.

Figure 33:
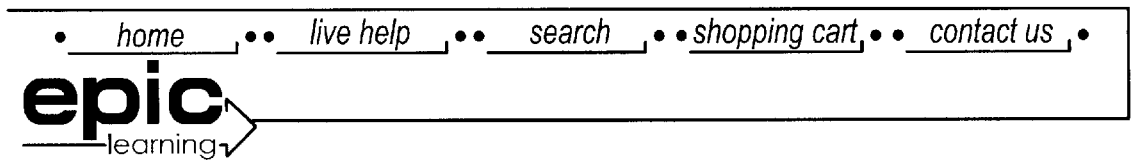
FIG. 33 is a screen view that illustrates a Web page provided to an end-user upon selection of a change homeroom password option, within a Member Services category of the non-fee based educational homeroom.

In addition to the abovementioned Member Services options, the end-user may also select to change their educational homeroom password. Selection of the change homeroom password option provides the end-user with a change homeroom password Web page wherein the end-user may enter an alternative password. In accordance with the preferred embodiment of the invention, after entering the new password, a new password validation check is provided such that correct spelling, or characters are used in entering of the password. In addition, an option for a password hint is once again provided, such that the end-user may recall the entered password at a future time. Selection of the save changes option then changes the end-user's password within the student table 82 of the Web server database 72. FIG. 33 is a screen view illustrating an example of a Web page received by the end-user's browser upon selection of change homeroom password option.

Fee Based Homeroom

As shown by block 214 of FIG. 4, if an end-user has previously expressed educational interest, the end-user's Web browser receives a fee based educational homeroom, an example of which is shown by FIG. 8. It should be noted that, due to similarities between the non-fee based educational homeroom and the fee based educational homeroom, the following fee based educational homeroom disclosure may make reference to the non-fee based educational homeroom disclosure provided hereinabove.

As shown by FIG. 8, the fee based educational homeroom contains the same seven educational categories as the non-fee based educational homeroom. Once again, it should be noted that all seven educational categories are not necessarily required to provide for the educational environment provided by the fee based educational homeroom, but instead, any number of the seven educational categories may be implemented.

Knowledge Areas

In accordance with the preferred embodiment of the invention, the fee based educational homeroom, among other educational categories, provides a knowledge area category for selection by an end-user. Like the non-fee based educational homeroom, the knowledge area category within the fee based educational homeroom allows an end-user to select between a number of educational categories of training which are presented as hyperlinks. As illustrated by FIG. 8, knowledge areas provided by the fee based educational homeroom may include, but are not limited to, Microsoft Networking, Novell Networking, Oracle Database Administration, Web Development, and Microsoft Office. As known by one of ordinary skill in the art, any number of educational categories may be provided within the Knowledge Areas category.

For purposes of providing an example, options provided after selection of the Microsoft Networking knowledge area are described in detail hereinafter. It should be noted, however, that selection of other knowledge areas provides the end-user with Web pages that provide substantially the same selections as described hereinafter with reference to the Microsoft Networking knowledge area.

Selection of the Microsoft Networking knowledge area hyperlink, within the fee based educational homeroom, returns a Microsoft Networking knowledge area Web page to the end-user's browser. An example of the fee based Microsoft Networking knowledge area is shown by FIG. 34. As in the non-fee based educational homeroom, the Microsoft Networking knowledge area provides a predefined list of categories that is tailored to providing educational assistance in the area of Microsoft networking.

One category provided within the Microsoft Networking knowledge area is the Training Plans category. As in the non-fee based educational homeroom, the Training Plans category provides the end-user with an assortment of training plans that are focused on improving the end-user's knowledge within the selected knowledge area. Therefore, in accordance with the current example, training plans provided to the end-user are focused on improving the end-user's knowledge within the Microsoft Networking knowledge area. It should be noted that when an end-user expresses educational interest in additional knowledge areas, training plans focused on those knowledge areas are made available to the end-user.

Particular to the fee based educational homeroom, if the end-user has expressed educational interest in the Microsoft Networking knowledge area, the Training Plans category is dynamically changed such that the Training Plans category provides training plans pertaining to the Microsoft Networking area. Preferably, the training plan is dynamically generated by the program controller 64, from the Web server database 72 of FIG. 2.

Figure 36:
FIG. 36 is a screen view that illustrates a Web page provided to a fee based educational homeroom end-user, upon selection of a "view all courses" option, within the Microsoft Certified Systems Engineer live online training plan Web page of FIG. 35.

FIG. 35 is a screen view illustrating an example of a Web page received by the end-user's browser upon selection of a Microsoft Certified Systems Engineer (MCSE) live online option within the Training Plans category. As illustrated, the training plan Web page contains a hyperlink list of training plan options that are available to the end-user upon selection. A first option available to the end-user is to "view all courses" within the training plan. FIG. 36 is a screen view illustrating a Web page returned to the end-user's Web browser upon selection of a "view all courses" hyperlink within the Microsoft Networking training plan. As shown by FIG. 36 each training plan Web page comprises six subtitles, which define separate columns, namely, "Step," "Task To Do," "Task Type," "Action," "Done?," and "Comments."

Each training plan is separated into a select number of required steps that may be performed at the leisure of the end-user. Implementation of this method allows the end-user to learn at their own pace, thereby assuring that the end-user obtains a self-regulated learning experience. While training plans for different knowledge areas may contain different courses, in addition to other educational tools, the above six subtitles are preferably used by all training plans.

The "Task To Do" column describes tasks within each step that are to be performed by the end-user before each step can be considered complete. Preferably, the description of the task is provided as a hyperlink, such that selection of the hyperlink initiates an educational tool for use in conjunction with the task to be performed. As an example, within step 3 of a training plan, if the "Task To Do" stated Lab #12, selection of the Lab #12 hyperlink would return Web page to the end-user's Web browser having a detailed description of lab work to performed for completion of step 3. It should be noted that one step may comprise several tasks.

The "Task Type" column describes the type of task required to perform a corresponding task. Task types may include, but are not limited to, reading assignments, lab work, online I-led instruction, computer-based training, self-study, archived I-led instruction, or testing. Preferably, each task to do corresponds to a single task type, thereby providing a simplified and sequential learning experience.

The "Action" column provides options to the end-user to either "go enroll" in a class, or review an "assignment" associated with the task to do. Therefore, while the task to do column describes the task to be performed to complete the associated step within the selected training plan, the action column provides the end-user with the actual assignment to be performed in order to complete the task to do.

If the end-user has completed a task within the "Task To Do" column, the "Done?" column provides the end-user with the date in which the task was performed. This allows an end-user to monitor the pace at which they are progressing and make adjustments according to their individual goals. Alternatively, if a task has not been performed by the end-user, the done column states that the task is "not done."

Finally, the "Comments" column allows the end-user to provide comments and concerns regarding a specific task to do. When selected, the "Comments" column opens a separate window within the end-user's Web browser, in which the end-user may type comments and concerns. The typed portion may then be submitted to the provider of the training plan as a means of feedback from students. Of course, any means of commenting on a specific task to do may be supplemented, such as, but not limited to, opening a form page within the same Web browser, opening a white board, or opening a chat room.

Referring to FIG. 35, in order to ease visibility of an end-user's training plan, nine options are provided to the end-user, in hyperlink form, in addition to the "View All Courses" option within the training plans Web page. Namely, the end-user may select from viewing "all courses to be completed," "all completed courses," "all computer-based teaching assignments," "all reading assignments," "all lab assignments," "all online instructor led classes," "all self study assignments," "all practice exams," and "all the archived instructor led classes." One skilled in the art will appreciate that any number of the above-mentioned options may be provided by the present fee-based educational homeroom.

As shown by FIG. 35, the training plans Web page also provides the end-user with the option of viewing each exam required to be performed for the completion of a training plan. As illustrated, hyperlinks to the exams are provided to the end-user via the training plans Web page. Selection of an exam returns an exam Web page to the end-user. The exam Web page provides the end-user with options similar to those illustrated with reference to FIG. 36, however all options are focused on the exam selected by the end user. FIG. 37 shows an example of the exam Web page that focuses on preparing for, and taking, a Transmission Control Protocol/Internet Protocol (TCP/IP) exam.

Preferably, the exam is provided to the end-user via the Internet such that the time provided for taking the exam may be monitored, as well as allowing grading and end-user progression, to be monitored. By providing an atmosphere wherein an end user's exam performance may be monitored, the end-user is capable of determining what areas within a knowledge area he/she needs to focus on, or obtain further instruction.

Referring back to FIG. 34, a second category offered to the end-user for selection within the Microsoft Networking knowledge area is the Seminars category. The Seminars category for the fee-based educational homeroom provides the same educational tools as provided within the non-fee based educational homeroom. As such, since the seminars category has been described in detail hereinabove with reference to the non-fee based educational homeroom, further description of the seminars category is not provided herein.

A third category offered to the end-user, for selection within the Microsoft Networking knowledge area of the educational homeroom, is the I-led schedule category. For the fee-based educational homeroom, the I-led category presents the end-user with a schedule of I-led classes into which the end-user may enroll, or in which the end-user has previously enrolled. As with the non-fee based educational homeroom, each listed I-led class is followed by a status field in which the status of end-user registration is listed.

If the end-user has registered for an I-led class, the status field may read "enrolled." However, unlike the non-fee-based educational homeroom, the status field of non-registered I-led classes may read either "open" or "closed," thereby notifying the end-user as to whether the end-user may register for the associated I-led class. As an example, if an end-user has not enrolled into a required I-led class that is necessary to complete a selected course, and the class has not reached its limit for registration, the status field will read "open." However, if a required I-led class is not enrolled into by the end-user and has reached its limit for registration, the status field will read "closed."

A fourth category presented to the end-user for selection within the Microsoft Networking knowledge area of the fee based educational homeroom is the Learning Resources category. As with the non-fee based educational homeroom, the Learning Resources category, within the fee-based educational homeroom, provides a list of hyperlinks, by topic, to the end-user that are named according to the type of resource made available by the hyperlink. When a specific hyperlink is selected, the end-user's browser receives a Web site that is focused on learning resources particularly relevant to the hyperlink topic selected, thereby providing the end-user with the opportunity of receiving further educational information within the knowledge area selected.

A fifth category offered to the end-user for selection within the Microsoft Networking knowledge area of the fee based educational homeroom is the Getting Started category. As in the non-fee based educational homeroom, the Getting Started category provides instructional information to the end-user that is specific to the selected Knowledge Area. Information within the Getting Started category is provided to the end-user as a list of hyperlinks to documents that are tailored toward explaining to the end-user how to best benefit from the selected Knowledge Area.

In addition to the abovementioned Knowledge Area categories provided, the Knowledge Area Web page also provides a drop down menu having alternative knowledge areas listed, wherein an end-user may ask a coach questions within different areas. Questioning of the coach may be performed via email, chat room, whiteboard, or any other means of communication.

Career Center

Referring back to FIG. 8, the fee-based educational homeroom further provides a Career Center category. As in the non-fee based educational homeroom, the Career Center category provides the end-user with numerous career tools that are tailored toward assisting the end-user in the selection and maintenance of a career.

With reference to selections provided within the Career Center category of the fee based educational homeroom, all selections are similar to the selections provided within the Career Center category of the non-fee based educational homeroom with the exception of the enrolled classes selection. Therefore, only the enrolled classes selection within the Career Center category is described hereinbelow.

The enrolled classes selection provides the end-user with a tabular listing of classes in which the end-user is presently enrolled. Preferably, the listing of classes are accompanied by an option to either launch, or if the end-user has previously enrolled for the class, to un-enroll from the class.

Salary Smarts

Returning to FIG. 8, the fee based educational homeroom also provides a Salary Smarts category. Since the Salary Smarts category within the fee-based educational homeroom is the same as the salary smarts category within that non-fee-based educational homeroom, further discussion of the salary smarts category is not provided herein.

Study Rooms

As illustrated by FIG. 8, the fee based educational homeroom also provides a Study Rooms category, as is provided by the non-fee based educational homeroom. Once again, since the Study Rooms category within the fee based educational homeroom is the same as the Study Rooms category within the non-fee based educational homeroom, further discussion of the Study Rooms category is not provided herein.

Discussion Forums

As illustrated by FIG. 8, the fee based educational homeroom also provides a Discussion Forum category, as is provided by the non-fee based educational room. Due to the Discussion Forum category for the fee based educational homeroom being the same as the Discussion Forum category within the non-fee based educational homeroom, further discussion of the Discussion Forum category is not provided herein.

Member Services

As illustrated by FIG. 8, the fee based educational homeroom also provides a Member Services category, as is provided by the non-fee based educational room. Since the Member Services category within the fee based educational homeroom is the same as the Member Services category within the non-fee based educational homeroom, further discussion of the Member Services category is not provided herein.

I-led Schedule

FIG. 8 also shows that the fee-based educational homeroom provides an I-led Schedule category. Preferably, the I-led Schedule category provides a list of instructor led classes in which the end-user is either currently enrolled, or is required to enroll for completion of a training plan. The number of I-led classes listed by the I-led Schedule category may differ. Preferably, the next five I-led classes scheduled for all training plans assigned to the end-user are listed as hyperlinks within the I-led Schedule category.

A status column is also provided within the I-led schedule category. Preferably, the status column reads "enrolled" for classes in which the end-user has previously enrolled. Required classes that have not been enrolled into by the end-user are categorized by either an "open" or "closed" status. If the number of students that have enrolled in the class has reached a predefined maximum, as defined in the course enrollment table of the Web server database 51, the status field will reflect this by stating that the class is "closed." If however, the number of students that have enrolled in the class has not reached the predefined maximum, the end-user may register for the class by clicking on a related hyperlink that represents the class.

Blended Learning System

While the abovementioned describes an educational homeroom for providing user specific educational tools and information, one would appreciate that having a learning system (hereinafter referred to as a blended learning system) that implements the advantages of the abovementioned learning tools, would also be beneficial. Such advantages include use of the I-led classes, coaching, computer based training, exercise labs, knowledgeable databases containing information on knowledge areas, pre-certification practice examinations, and/or published study guides and books. It should be noted that when a student selects a learning topic, the abovementioned learning tools are focused upon that topic. The combination of these educational tools provides a blended learning system that uses a combination of self-study and human instruction, thereby allowing an end-user to learn at their own pace, repeat lessons until fully learned, and to learn at their own pace.

Alternatively, the level of educational difficulty taught by the educational tools may be determined by providing the end-user with a series of questions within a selected learning topic. Analysis of the answers to these questions may then be used to determine an educational level that would be most beneficial to the end-user.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Now, therefore, at least the following is claimed:

1. A system for providing educational tools and educational information to a user, via an educational homeroom, comprising:

logic configured on an interface server connected to the Internet to enable said user to transmit and receive said educational information, from and to a database; and logic configured on said interface to provide said educational homeroom to maintain a central location via which said user may view said educational information in a coordinated presentation and interact with said educational tools, wherein said educational homeroom is further categorized by the following:

a knowledge area which allows said user to select between a predefined selection of educational categories;

a career center which provides said user with a series of career tools that are focused on assisting said user in the selection and maintenance of a career;

a salary center which provides said user with articles and a listing of hyperlinks to salary related Web sites;

a study room in which said user may participate in a chat room format technology discussion focused upon a user selected educational category;

a discussion forum which provides said user with a means of posting and reading text formatted articles within a user selected educational category; and a member services area in which said user may alter personal information saved within said database.

* * * * *